United States Patent
Yao et al.

(10) Patent No.: US 11,677,837 B2
(45) Date of Patent: Jun. 13, 2023

(54) SESSION HANDLING METHOD, COMMUNICATIONS APPARATUS, AND COMMUNICATIONS SYSTEM

(71) Applicant: HUAWEI TECHNOLOGIES CO., LTD., Guangdong (CN)

(72) Inventors: Qi Yao, Beijing (CN); Zaifeng Zong, Nanjing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/492,609

(22) Filed: Oct. 3, 2021

(65) Prior Publication Data
US 2022/0030069 A1 Jan. 27, 2022

Related U.S. Application Data
(63) Continuation of application No. PCT/CN2020/082767, filed on Apr. 1, 2020.

(30) Foreign Application Priority Data
Apr. 2, 2019 (CN) .......................... 201910262879.X

(51) Int. Cl.
G06F 15/16 (2006.01)
H04L 67/14 (2022.01)
(52) U.S. Cl.
CPC .................................... H04L 67/14 (2013.01)
(58) Field of Classification Search
CPC ........ H04W 76/22; H04W 36/12; H04L 67/14
See application file for complete search history.

(56) References Cited

U.S. PATENT DOCUMENTS

| | | | |
|---|---|---|---|
| 2018/0279397 A1* | 9/2018 | Faccin | H04W 76/15 |
| 2019/0007500 A1* | 1/2019 | Kim | H04L 67/141 |
| 2019/0007992 A1* | 1/2019 | Kim | H04W 76/27 |
| 2019/0098536 A1 | 3/2019 | Qiao et al. | |

(Continued)

FOREIGN PATENT DOCUMENTS

| | | |
|---|---|---|
| CN | 108811009 A | 11/2018 |
| CN | 109121170 A | 1/2019 |

(Continued)

OTHER PUBLICATIONS

3GPP TS 23.501 V16.0.0+ (Feb. 2019),3rd Generation Partnership Project;Technical Specification Group Services and System Aspects-;System Architecture for the 5G System;Stage 2(Release 16),total 281 pages.

(Continued)

*Primary Examiner* — Duyen M Doan
(74) *Attorney, Agent, or Firm* — Gregg L. Jansen

(57) ABSTRACT

This application provides a session handling method, a communications apparatus, and a communications system. The session handling method includes receiving, by an intermediate session management function (SMF), a request message sent by an access and mobility management function (AMF), where the request message includes a session identifier, and the intermediate SMF is an SMF selected by the AMF when user equipment (UE) moves outside of a service area of an anchor SMF. When a session corresponding to the session identifier is a local area data network (LADN) session, rejecting, by the intermediate SMF, the session corresponding to the session identifier. According to the technical solutions provided in this application, the user equipment can no longer access a service of a LADN after moving outside of the service area of the anchor SMF, which avoids a waste of service resources of the LADN.

17 Claims, 14 Drawing Sheets

(56) References Cited

U.S. PATENT DOCUMENTS

| | | | | |
|---|---|---|---|---|
| 2019/0306251 A1* | 10/2019 | Talebi Fard | .......... | H04W 76/10 |
| 2019/0313468 A1* | 10/2019 | Talebi Fard | .......... | H04W 76/12 |
| 2020/0128450 A1* | 4/2020 | Wang | .................... | H04W 60/00 |
| 2020/0336937 A1* | 10/2020 | Youn | .................... | H04W 76/12 |
| 2021/0307101 A1* | 9/2021 | Kim | ...................... | H04W 60/00 |
| 2021/0410107 A1* | 12/2021 | Park | ...................... | H04W 8/183 |
| 2022/0022089 A1* | 1/2022 | Zhu | .................. | H04W 28/0268 |

FOREIGN PATENT DOCUMENTS

| | | | |
|---|---|---|---|
| CN | 109219952 | A | 1/2019 |
| EP | 2262176 | B1 | 7/2013 |
| RU | 2497307 | C9 | 3/2014 |
| WO | 2018066799 | A1 | 4/2018 |
| WO | 2018111029 | A1 | 6/2018 |
| WO | 2018127190 | A1 | 7/2018 |

OTHER PUBLICATIONS

Huawei et al.,"LADN PDU Session handling in ETSUN scenario",3GPP TSG-SA WG2 Meeting #132 S2-1903552,Xi an, China, Apr. 8 Apr. 12, 2019,Total 17 Pages.

3GPP TS 23.502 V16.0.2 (Apr. 2019);3rd Generation Partnership Project Technical Specification Group Services and System Aspects;Procedures for the 5G System; Stage 2(Release 16);total 419 pages.

3GPP TR 23.726 V16.0.0 (Dec. 2018),3rd Generation Partnership Project;Technical Specification Group Services and System Aspects;Study on Enhancing Topology of SMF and UPF in 5G Networks (Release 16),total 96 pages.

3GPP TS 23.501 V16.0.2 (Apr. 2019);3rd Generation Partnership Project;Technical Specification Group Services and System Aspects;System Architecture for the 5G System;Stage 2(Release 16);total 317 pages.

3GPP TS 23.502 V16.0.0 (Mar. 2019), 3rd Generation Partnership Project; Technical Specification Group Services and System Aspects; Procedures for the 5G System; Stage 2(Release 16), 420 pages.

3GPP TS 32.255 V16.0.0 (Mar. 2019);3rd Generation Partnership Project;Technical Specification Group Services and System Aspects;Telecommunication managementcharging management;5G data connectivity domain charging stage 2(Release 16),total 71 pages.

Zte, Etsun Xn handover [online], 3GPP TSG SA WG2 #131, 3GPP, Mar. 1, 2019, S2-1902300, Total 4 Pages.

* cited by examiner

SESSION HANDLING METHOD, COMMUNICATIONS APPARATUS, AND COMMUNICATIONS SYSTEM

CROSS-REFERENCE TO RELATED APPLICATIONS

This application is a continuation of International Application No. PCT/CN2020/082767, filed on Apr. 1, 2020, which claims priority to Chinese Patent Application No. 201910262879.X, filed on Apr. 2, 2019. The disclosures of the aforementioned applications are hereby incorporated by reference in their entireties.

TECHNICAL FIELD

This application relates to the communications field, and in particular, to a session handling method, a communications apparatus, and a communications system.

BACKGROUND

A local area data network (LADN) is a network covering a specific local area, for example, a network covering a place such as an enterprise, a campus, an airport, a railway station, a shopping mall, or a stadium. User equipment (UE) can access the LADN via a packet data unit (PDU) session for the LADN only when the UE is in a service area of the LADN.

The UE accesses a local user plane function (UPF) via a radio access network, to directly access a local network. The UE can obtain frequently-used data from the LADN without accessing a network other than the LADN. This reduces a delay in obtaining the data and reduces bandwidth occupied because the UE frequently requests the data from the network other than the LADN.

The LADN covers only a specific service area. LADN information is configured on an access and mobility management function (AMF). The AMF is configured with only information about a LADN in a service area of the AMF, for example, a service area of the LADN. When the UE moves from the LADN to another network, the UE may correspond to a new AMF. In addition, in a current network architecture, two SMFs may be involved based on a requirement of the UE in a network handover process. For example, an inserted intermediate SMF provides an intermediate UPF for UE that cannot access an anchor UPF corresponding to an anchor SMF. In this way, the UE can access the anchor UPF. However, when the intermediate SMF is not configured with information about a LADN, the intermediate SMF cannot identify received indication information related to a session for the LADN, and cannot send, to the anchor SMF, indication information related to the LADN, affecting a normal session operation of the anchor SMF.

Therefore, when two SMFs are involved in a session handling procedure, how to ensure that an anchor SMF properly triggers a session operation becomes an urgent problem to be resolved.

SUMMARY

This application provides a session handling method, a communications apparatus, and a communications system, to resolve a problem that a session cannot be properly handled when there are two session management functions SMFs.

According to a first aspect, a session handling method is provided, including: receiving, by an intermediate session management function SMF, a request message sent by an access and mobility management function AMF, where the request message includes a session identifier, and the intermediate SMF is an SMF selected by the AMF when user equipment UE moves outside of a service area of an anchor SMF; and when a session corresponding to the session identifier is a local area data network LADN session, rejecting, by the intermediate SMF, the session corresponding to the session identifier.

According to the session handling method in this embodiment of this application, when the intermediate SMF learns that the requested session is the LADN session, the intermediate SMF rejects the session, and the UE can no longer access a service of a LADN after moving outside of the service area of the anchor SMF. This avoids a waste of service resources of the LADN.

With reference to the first aspect, in some implementations of the first aspect, the method further includes: determining, by the intermediate SMF based on a session context sent by the anchor SMF, that the session is the LADN session, where the session context includes first indication information used to indicate that the session is the LADN session; or determining, by the intermediate SMF based on second indication information sent by the AMF, that the session is the LADN session, where the second indication information is used to indicate that the UE is outside of a service area of the LADN.

With reference to the first aspect, in some implementations of the first aspect, the method further includes: sending, by the intermediate SMF, a first message to the AMF, where the first message includes cause information.

With reference to the first aspect, in some implementations of the first aspect, the cause information includes: rejects insertion of an intermediate SMF and an intermediate user plane function UPF is rejected for the LADN session.

With reference to the first aspect, in some implementations of the first aspect, the service area of the LADN corresponding to the LADN session is in the service area of the anchor SMF According to a second aspect, a session handling method is provided, including: sending, by an AMF, a request message to an intermediate SMF, where the request message includes a session identifier, and the intermediate SMF is an SMF selected by the AMF when UE moves outside of a service area of an anchor SMF; and receiving, by the AMF, a first message sent by the intermediate SMF, where the first message includes cause information.

According to the session handling method in this embodiment of this application, when the anchor SMF learns that a requested session is a LADN session, the anchor SMF rejects the session, and the UE can no longer access a service of a LADN after moving outside of the service area of the anchor SMF. This avoids a waste of service resources of the LADN.

With reference to the second aspect, in some implementations of the second aspect, the cause information includes: insertion of an intermediate SMF and an intermediate user plane function UPF is rejected for the LADN session.

With reference to the second aspect, in some implementations of the second aspect, the method further includes: sending, by the AMF, the cause information to a radio access network RAN.

With reference to the second aspect, in some implementations of the second aspect, the method further includes: sending, by the AMF, a session release request message to the anchor SMF, where the session release request message is used to request the anchor SMF to release the LADN session.

With reference to the second aspect, in some implementations of the second aspect, the LADN to which the LADN session belongs is in the service area of the anchor SMF.

According to a third aspect, a session handling method is provided, including: receiving, by an anchor SMF, a request message sent by an intermediate SMF, where the request message includes a session identifier, and the intermediate SMF is an SMF selected by an AMF when UE moves outside of a service area of the anchor SMF; and when a session corresponding to the session identifier is a LADN session, rejecting, by the anchor SMF, the session corresponding to the session identifier, where the LADN session is a session served by the anchor SMF.

With reference to the third aspect, in some implementations of the third aspect, the request message is used to request insertion of the intermediate SMF.

With reference to the third aspect, in some implementations of the third aspect, the method further includes: determining, by the anchor SMF based on a session context, that the current session is the LADN session; or determining, by the anchor SMF based on configuration information, that the current session is the LADN session, where the configuration information includes: a DNN corresponding to the current session is a LADN.

With reference to the third aspect, in some implementations of the third aspect, the method further includes: sending, by the anchor SMF, a second message to the intermediate SMF, where the second message includes cause information, and the cause information is used to indicate that the session fails to be activated, or the cause information is used to indicate the intermediate SMF to reject activation of the session.

With reference to the third aspect, in some implementations of the third aspect, the rejecting, by the anchor SMF, the session corresponding to the session identifier includes: releasing, by the anchor SMF, the session corresponding to the session identifier; or deactivating, by the anchor SMF, the session corresponding to the session identifier; or rejecting, by the anchor SMF, activation or handover of the session corresponding to the session identifier.

With reference to the third aspect, in some implementations of the third aspect, the cause information includes: insertion of an intermediate SMF and an intermediate UPF is rejected for the LADN session.

With reference to the third aspect, in some implementations of the third aspect, a service area of the LADN corresponding to the LADN session is in the service area of the anchor SMF.

According to a fourth aspect, a session handling method is provided, including: receiving, by a first intermediate SMF, first indication information, where the first indication information is used to indicate that a data network name DNN corresponding to a current session is a LADN, and the first intermediate SMF is configured to control an intermediate UPF that interfaces with a target base station; sending, by the first intermediate SMF, second indication information to an anchor SMF, where the second indication information is used to indicate that UE is outside of a service area of the LADN, and the anchor SMF is an anchor SMF serving the current session; and releasing, by the anchor SMF, the current session based on the second indication information.

According to the session handling method in this embodiment of this application, the first intermediate SMF learns, based on the first indication information, that the current session is a LADN session, and may subsequently identify information about the LADN, to further process the LADN session.

With reference to the fourth aspect, in some implementations of the fourth aspect, the method further includes: receiving, by the first intermediate SMF, a third message sent by a target AMF; and when the third message does not include the indication information indicating that the UE is outside of the service area of the LADN, determining, by the first intermediate SMF, that the UE is outside of the service area of the LADN, where the target AMF is an AMF to which the UE is handed over.

With reference to the fourth aspect, in some implementations of the fourth aspect, the method further includes: receiving, by the first intermediate SMF, a fourth message sent by a target AMF; and when the fourth message includes: the UE is outside of the service area of the LADN, sending, by the first intermediate SMF, the second indication information to the anchor SMF.

Optionally, the first indication information is sent by any one of the following network elements: a source AMF, the target AMF, the anchor SMF, or a second intermediate SMF, where the second intermediate SMF is configured to control an intermediate UPF that interfaces with a source base station.

According to a fifth aspect, a session handling method is provided, including: receiving, by a target AMF, first indication information sent by a source AMF, where the first indication information is used to indicate that a DNN corresponding to a current session is a LADN; and when the target AMF determines that UE moves outside of a service area of the LADN, sending, by the target AMF, second indication information to a first intermediate SMF, where the second indication information is used to indicate that the UE is outside of the service area of the LADN, and the first intermediate SMF is configured to control an intermediate UPF that interfaces with a target base station.

It should be understood that after an AMF handover procedure is performed, a new AMF may not be configured with information about a LADN, and therefore, the new AMF cannot determine whether UE is in a service area of the LADN.

According to the session handling method in this embodiment of this application, a source AMF that is used before AMF handover is performed notifies the target AMF of information about the LADN, and the target AMF obtains the information about the LADN. Then, the target AMF may further notify the SMF of the information, to ensure proper handling of a LADN session.

With reference to the fifth aspect, in some implementations of the fifth aspect, that the target AMF determines that the UE moves outside of the service area of the LADN includes: when the target AMF is not configured with the information about the LADN, determining, by the target AMF, that the UE moves outside of the service area of the LADN.

With reference to the fifth aspect, in some implementations of the fifth aspect, that the target AMF determines that the UE moves outside of the service area of the LADN includes: when the target AMF is configured with the information about the LADN, determining, by the target AMF based on the information about the LADN and a location of the UE, that the UE moves outside of the service area of the LADN.

With reference to the fifth aspect, in some implementations of the fifth aspect, the information about the LADN includes information about a service area of the LADN.

According to a sixth aspect, a communications apparatus is provided, including at least one processor and a communications interface, where the communications interface is used for information exchange between the network apparatus and another network apparatus, and when a program instruction is executed by the at least one processor, the network apparatus is enabled to implement a function of the intermediate SMF in the method according to any implementation of the first aspect.

According to a seventh aspect, a communications apparatus is provided, including at least one processor and a communications interface, where the communications interface is used for information exchange between the network apparatus and another network apparatus, and when a program instruction is executed by the at least one processor, the network apparatus is enabled to implement a function of the AMF in the method according to any implementation of the second aspect.

According to an eighth aspect, a communications apparatus is provided, including at least one processor and a communications interface, where the communications interface is used for information exchange between the network apparatus and another network apparatus, and when a program instruction is executed by the at least one processor, the network apparatus is enabled to implement a function of the anchor SMF in the method according to any implementation of the third aspect.

According to a ninth aspect, a communications apparatus is provided, including at least one processor and a communications interface, where the communications interface is used for information exchange between the network apparatus and another network apparatus, and when a program instruction is executed by the at least one processor, the network apparatus is enabled to implement a function of the first intermediate SMF in the method according to any implementation of the fourth aspect.

According to a tenth aspect, a communications system is provided, including an intermediate session management function SMF and an access and mobility management function AMF that are configured to perform the method according to the first aspect.

According to an eleventh aspect, a communications system is provided, including an anchor SMF, an intermediate SMF, and an AMF that are configured to perform the method according to the second aspect.

According to a twelfth aspect, a communications system is provided, including a intermediate SMF and an anchor SMF that are configured to perform the method according to the third aspect.

According to a thirteen aspect, a communications system is provided, including a source SMF and a target SMF that are configured to perform the method according to the fourth aspect.

According to a fourteenth aspect, a computer program product is provided, where the computer program product includes computer program code, and when the computer program code is run by a communications apparatus (for example, a terminal device or a network device), the communications apparatus is enabled to perform the method according to any one of the first aspect to the fifth aspect or any implementation of the first aspect to the fifth aspect.

According to a fifteenth aspect, a computer-readable storage medium is provided, where the computer-readable storage medium stores a program instruction, and the program instruction enables a communications apparatus (for example, a terminal device or a network device) to perform the method according to any one of the first aspect to the fifth aspect or any implementation of the first aspect to the fifth aspect.

DESCRIPTION OF EMBODIMENTS

Figure 1:
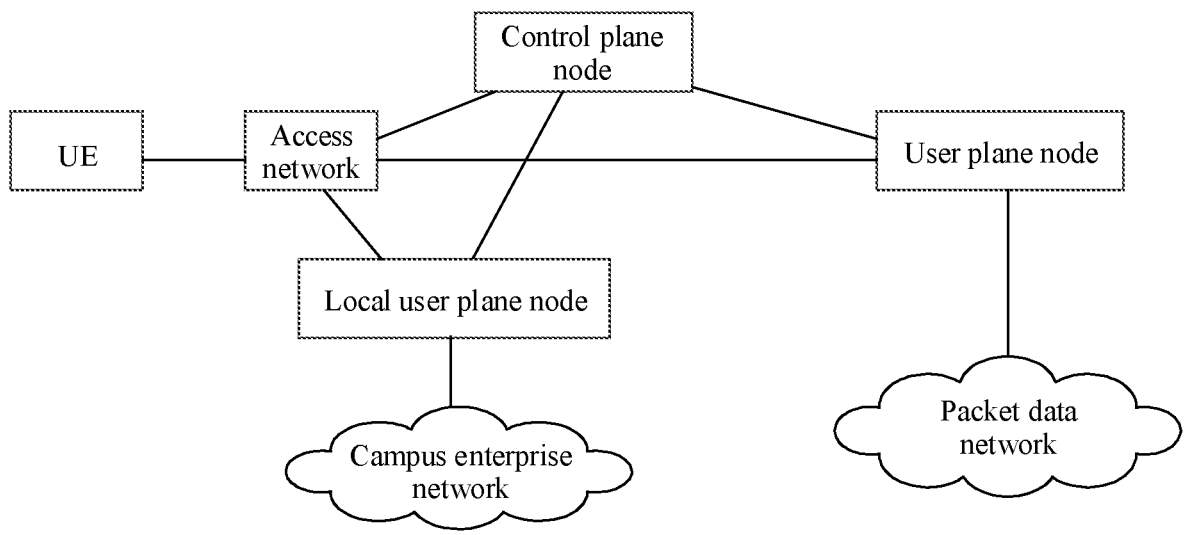
FIG. 1 is a schematic diagram of an architecture of a local network system.

The following describes the technical solutions of this application with reference to the accompanying drawings.

The technical solutions in the embodiments of this application may be applied to various communications systems, such as a global system for mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD), a universal mobile telecommunications system (UMTS), a worldwide interoperability for microwave access (WiMAX) communications system, and a future 5th generation (5G) system or a new radio (NR) system. The foregoing systems each may include a session management network element and an access and mobility management network element. In different systems, a network element having a session management function and a network element having an access and mobility management function may correspond to different names. For example, in the 5G system, a session management network element may be referred to as an SMF, and an access and mobility management network element may be referred to as an AMF.

A terminal apparatus in the embodiments of this application may be user equipment (user equipment, UE), a terminal device, an access terminal, a subscriber unit, a subscriber station, a mobile station, a mobile station, a remote station, a remote terminal, a mobile device, a user terminal, a terminal, a wireless communications device, a user agent, or a user apparatus. Alternatively, the terminal device may be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, a wearable device, a terminal device in a future 5G network, a terminal device in a future evolved public land mobile network (public land mobile network, PLMN), or the like. Alternatively, the terminal apparatus or the user equipment may be a chip. This is not limited in the embodiments of this application.

The technical solutions provided in the embodiments of this application are applicable to a session handling scenario specific to a LADN. When user equipment enters a service area of a LADN, a session is established to access a service of the LADN. The session may be a LADN session, and the LADN session is a session used to perform data transmission in the service area of the LADN for the UE. An anchor SMF (anchor-SMF, A-SMF) may manage a service such as session establishment, session release, or session deactivation in the LADN. In a current network system, an anchor SMF cannot sense location information of the UE by itself, and needs to subscribe to the location information of the UE from an access and mobility management function (access and mobility management function, AMF). The AMF may detect whether the UE is in the service area of the LADN, and send, to the anchor SMF, indication information indicating whether the UE is in the service area of the LADN. For example, when the AMF detects that the UE moves outside of the service area of the current LADN, the AMF may send, to the anchor SMF, indication information indicating that the UE is outside of the service area of the LADN or the UE moves outside of the service area of the LADN. For example, the indication information may be "OUT" indicated in a UE presence in LADN notification message, so that the anchor SMF learns that the UE moves outside of the service area of the current LADN. Then, the anchor SMF releases or deactivates the session, and the UE can no longer access the service provided by the LADN.

When the UE moves outside of a service area of the anchor SMF, AMF handover may be performed. In other words, the UE needs to be handed over from a source AMF to a target AMF. The source AMF is an AMF used before the UE moves, and the target AMF is a new AMF to which the UE is handed over after the UE moves. The source AMF is configured with information about the LADN, but the target AMF may not be configured with information about the LADN. The information about the LADN may be, for example, a network name corresponding to the LADN, or information about a service area of the LADN. Therefore, the target AMF may not send, to the anchor SMF, indication information indicating whether the UE moves outside of the service area of the LADN. In addition, because a location of the UE changes during movement, the UE cannot directly access, via a RAN, an anchor UPF (A-UPF) controlled by the anchor SMF. In this case, an intermediate SMF (I-SMF) is to be introduced. The intermediate SMF may select and insert an intermediate UPF (I-UPF) to connect the RAN and the anchor UPF. It should be understood that when two SMFs (the anchor SMF and the intermediate SMF) are involved in the network system, the anchor SMF may be configured with information about which DNN corresponds to a LADN, and may perform a related operation of a LADN session, for example, establishment, release, or deactivation of the LADN session. However, the intermediate SMF in the current network system may usually not be configured with information about which DNN corresponds to a LADN. As a result, when the intermediate SMF exists, there may be a problem in handling the LADN session. For example, when the UE is handed over to the new AMF after the UE moves, because the new AMF is not configured with the information about the LADN, the AMF may not send, to the intermediate SMF, an indication information indicating that the UE moves outside of the LADN. In this case, because the intermediate SMF is not configured withwhich DNN is the LADN, the intermediate SMF cannot learn that a current session is a LADN session, and may not send, to the anchor SMF, a notification message indicating that the UE moves outside of the LADN. Then, the anchor SMF cannot learn that the UE moves outside of the service area of the LADN, and may not trigger an operation of deactivating or releasing the session. Consequently, the UE still accesses the LADN after moving outside of the service area of the LADN. This is against a principle of accessing a LADN service.

FIG. 1 is a schematic diagram of an architecture of a local area network according to an embodiment of this application.

A LADN is a network that covers a specific local area. UE accesses a local UPF via a RAN, to directly access the LADN. The local UPF may be, for example, a UPF in a campus enterprise network or a UPF close to the LADN. Direct access to the LADN by the UE can reduce a delay in accessing an application and reduce occupied transmission bandwidth of a backbone network. The LADN may be applied to, for example, a stadium, a campus, an enterprise, or a shopping mall. In the stadium, the LADN is used to provide on-site virtual reality (virtual reality, VR) live broadcast. On campus, the LADN is used to provide intra-campus communication to enable UE to access on-campus learning resources. In the enterprise, the LADN is used to provide industrial control communication. In the shopping mall, the LADN is used to provide services such as local shopping discount push, and real-time position and navigation.

Information about the LADN may include information about a name and a corresponding service area of the LADN, and the like. The information about the LADN may be configured on an AMF. The AMF may be configured with only information about a LADN in a service area of the AMF. For example, an AMF in Beijing may not be configured with information about a LADN in Shenzhen. The AMF may detect, based on a service area of the LADN and a location of the UE, whether the UE is in the service area of the LADN. When the UE moves outside of the service area of the current LADN, the AMF sends, to an A-SMF, indication information indicating that the UE moves outside of the service area of the LADN. Then, the A-SMF releases or deactivates a LADN session established by the UE. In other words, the UE is no longer allowed to access a service of the LADN.

Figure 2:
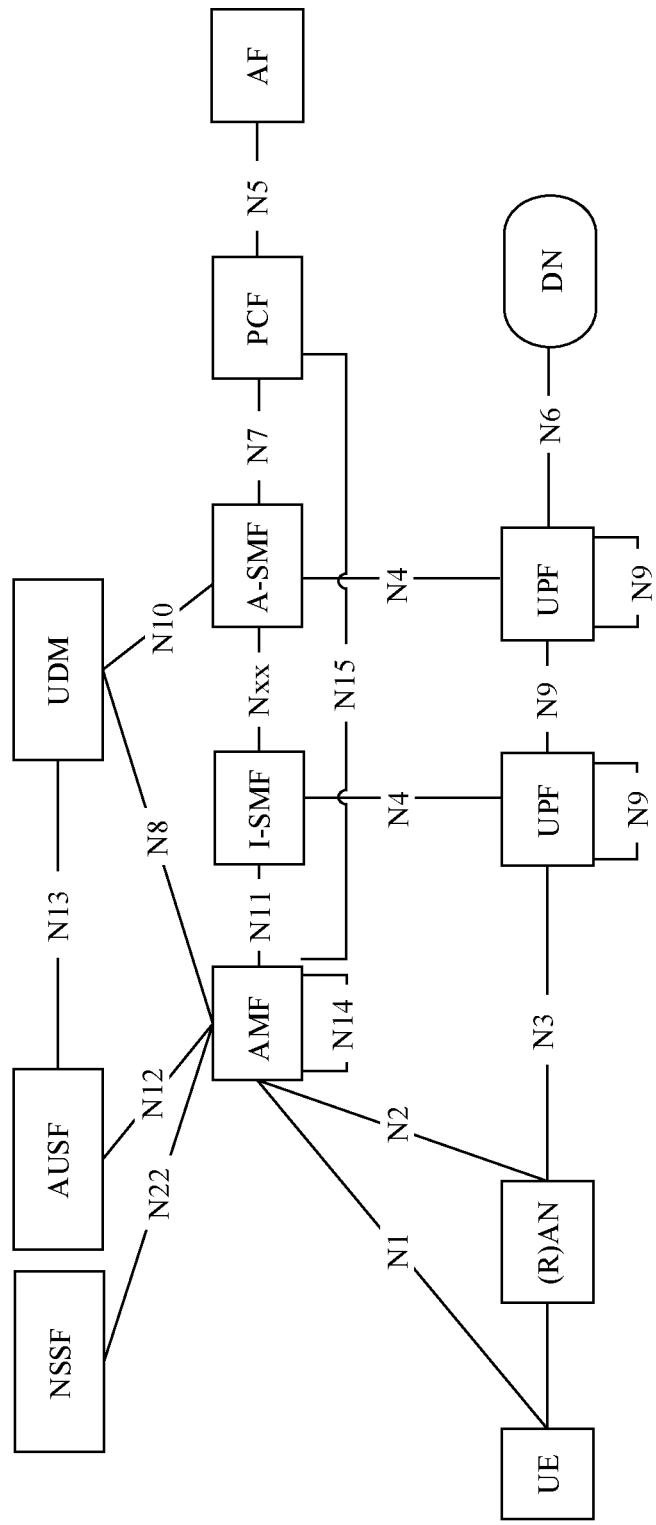
FIG. 2 is a schematic diagram of a network architecture of a 5G system.

FIG. 2 is a schematic diagram of a network architecture of a 5G system to which the embodiments of this application are applied.

In the 5G system, UE may perform RAN handover based on an Xn interface, where the Xn interface is an interface between a source access network (source-RAN, S-RAN) and a target access network (target-RAN, T-RAN). Network elements in the 5G system that are in a session handling method provided in the embodiments of this application include a RAN, a source AMF (source-AMF, S-AMF), a target AMF (target-AMF, T-AMF), an I-SMF, an A-SMF, a UPF, and the like. For ease of understanding, the following briefly describes some of the network elements in the 5G system that are in the embodiments of this application.

RAN: is an access network. In the embodiments of this application, the access network may include an access network S-RAN in a source network and an access network T-RAN in a target network.

AMF: is an access and mobility management function. The AMF mainly accesses non-access stratum (non-access stratum, NAS) signaling of UE via N1, and accesses RAN signaling via N2. The NAS signaling may include, for example, session management (session management, SM) signaling. The AMF may be used for a registration procedure of the UE, SM signaling forwarding, and mobility management.

SMF: is a session management function. As described above, the SMF in the embodiments of this application includes an I-SMF and an A-SMF. The A-SMF is an SMF serving a session. The A-SMF has a policy and charging control (policy and charging control, PCC) interface and a unified data management (unified data management, UDM) interface, and may be configured to perform UE internet protocol (internet protocol, IP) address allocation and the like. The I-SMF may be configured to control an intermediate user plane function I-UPF that cannot be controlled by the A-SMF. The I-UPF may be an intermediate UPF between the RAN and a session anchor A-UPF. The I-SMF may be inserted, changed, or removed based on a requirement. For example, after UE moves outside of a service area of an A-SMF, a RAN to which the UE is attached may not be directly connected to an A-UPF controlled by the A-SMF. In this case, a new I-SMF may be inserted, and the I-SMF may select and insert an I-UPF. Then, the UE may first access the I-UPF via the RAN, and may be connected to the A-UPF via the I-UPF.

UPF: is a user plane function, and is mainly used for data packet forwarding, quality of service (quality of service, QoS) flow mapping, and the like.

The embodiments of this application may be applicable to a process in which UE moves outside of a service area of a LADN. The following describes the session handling method provided in the embodiments of this application with reference to FIG. 3.

Figure 3:
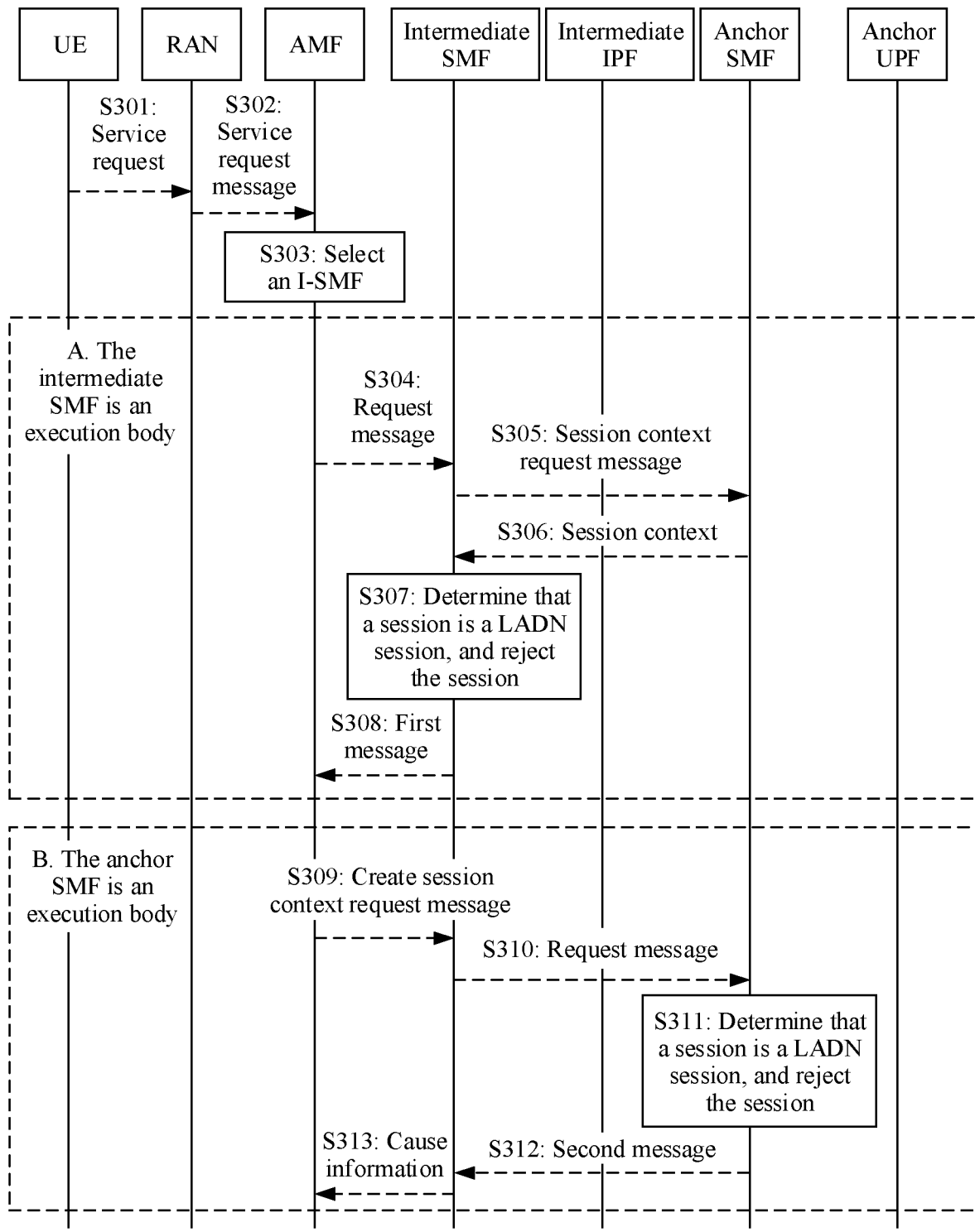
FIG. 3 is a schematic flowchart of a session handling method according to an embodiment of this application.

FIG. 3 is a schematic flowchart of a session handling method according to an embodiment of this application.

For ease of understanding, a scenario to which this embodiment is applied is first briefly described.

This embodiment is applicable to a process in which UE moves. Specifically, the UE establishes a LADN session in a service area of a LADN. However, the LADN session is subsequently deactivated, and the UE moves outside of the service area of the LADN. In the foregoing case, the UE initiates a service request outside of the service area of the LADN, to request activation of the LADN session. In this embodiment, it is defined that insertion of an intermediate SMF and an intermediate UPF to continue to access a service of the LADN is not allowed by the LADN session. In this way, handling of the LADN session during movement is simplified. For example, in an implementation, it may be assumed that the service area of the LADN is a subset of a service area of an anchor SMF. In other words, the service area of the LADN is included in the service area of the anchor SMF. When the UE moves outside of the service area of the anchor SMF, the UE certainly moves outside of the service area of the LADN. It should be understood that in this embodiment, AMF handover may be performed or may not be performed. A specific procedure of the embodiment in FIG. 3 is as follows.

S301: The UE initiates a service request to a RAN.

Optionally, the UE initiates a service request procedure to the RAN. Specifically, the UE may send registration request information to the RAN. The registration request information includes an identifier of a to-be-activated session. The registration request information may include a list of identifiers of to-be-activated sessions. A DNN corresponding to the session identifier may be a LADN DNN, or may be a non-LADN DNN. In this embodiment, a case in which the DNN corresponding to the session identifier is a LADN DNN is described.

It should be understood that, the following descriptions have a same meaning: a DNN corresponding to a session identifier or a DNN corresponding to a session is a LADN DNN, or a DNN corresponding to a session identifier or a DNN corresponding to a session is a LADN, or a corresponding session is a LADN session, or a session corresponds to a LADN, or a DNN corresponding to a session identifier or a DNN corresponding to a session is a LADN. The foregoing descriptions are used to indicate that the session is a LADN session, and are applicable to all parts of this application. A general description is provided herein, and details are not described below again.

S302: The RAN sends a service request message to an AMF.

Optionally, a DNN corresponding to a session identifier included in the service request message sent by the RAN to the AMF is a LADN.

Optionally, the service request message is used to request activation of a current session. In an implementation, the request message may be used to request a session management (session management, SM) context.

S303: The AMF selects an intermediate SMF.

It should be understood that after the UE moves outside of the service area of the anchor SMF, the AMF selects and inserts the intermediate SMF. The intermediate SMF may select an intermediate UPF to be connected to an anchor UPF. For a process in which the AMF selects the intermediate SMF, refer to an existing procedure. Details are not described herein.

Optionally, the AMF may be a source AMF used before handover is performed, or may be a target AMF used after an AMF handover procedure is performed.

S304: The AMF sends a request message to the intermediate SMF.

The AMF sends the request message to the intermediate SMF. The request message is used to request creation of a session context, and includes the session identifier. The session identifier may be a PDU session ID, or may be another identifier that is used by the intermediate SMF to uniquely determine the session, such as a URI (Uniform Resource Identifier) or an SM context ID. This is not limited in this application.

It should be understood that when AMF handover is not performed, the AMF is configured with information about the LADN. The AMF may determine, based on the configured information about the LADN (including a LADN DNN, a corresponding service area, and the like) and location information of the UE, whether the UE moves outside of the service area of the LADN. In this case, a session create request message sent by the AMF to the intermediate SMF may include indication information indicating that the UE is outside of the service area of the LADN, namely, second indication information.

Optionally, when AMF handover is performed, the AMF is a new AMF used after handover. In this case, the AMF may not be configured with information about the LADN. A session create request sent by the AMF to the intermediate SMF may not include indication information indicating that the UE is outside of the service area of the LADN.

S305: The intermediate SMF sends a request message to the anchor SMF.

Optionally, the request message sent by the intermediate SMF to the anchor SMF is a session context request message. The request message is used to request, from the anchor SMF, a session context of the session corresponding to the session ID.

Optionally, the session context request message sent by the intermediate SMF to the anchor SMF may include the second indication information. The second indication information is used to indicate that the UE is outside of the service area of the LADN.

Optionally, the session context request message may further include indication information for requesting activation of the session.

S306: The anchor SMF sends a response message to the intermediate SMF, where the response message may be a session context response message.

As an example, the intermediate SMF receives the session context response message from the anchor SMF. The message includes the session context. The intermediate SMF determines, based on the session context, that the session is a LADN session. The intermediate SMF rejects the session corresponding to the session identifier. For example, the session context sent by the anchor SMF to the intermediate SMF includes first indication information. The first indication information is used to indicate that the DNN corresponding to the current session is the LADN.

As another example, the intermediate SMF receives the session context response message from the anchor SMF. Optionally, the session context response message includes cause information. The intermediate SMF rejects the session corresponding to the session identifier. Optionally, after the anchor SMF receives the session context request message from the intermediate SMF, if the anchor SMF determines that the current session is the LADN session, the anchor SMF rejects transmission of the session context to the intermediate SMF, and includes the cause information in the session context response message. The cause information may be: insertion of an I-SMF is rejected for the LADN session.

S307: The intermediate SMF rejects the session corresponding to the session identifier.

That the intermediate SMF rejects a session corresponding to the session identifier may have a plurality of implementations: The intermediate SMF rejects activation of the session corresponding to the session identifier, or the intermediate SMF rejects activation of a user plane of the session corresponding to the session identifier, or the intermediate SMF decides to release the session corresponding to the session identifier. It should be understood that, in a handover scenario, the intermediate SMF rejects handover of the session corresponding to the session identifier, or the intermediate SMF rejects activation of a user plane of the session corresponding to the session identifier, or the intermediate SMF decides to release the session corresponding to the session identifier. The user plane includes a transmission path between the RAN and a UPF, and/or a radio connection between the UE and the RAN.

As an example, the session context response message received by the intermediate SMF from the anchor SMF includes the session context. The session context may include the first indication information. The first indication information is used to indicate that the DNN corresponding to the current session is the LADN. The intermediate SMF rejects the session corresponding to the session identifier.

As another example, the session context response message received by the intermediate SMF from the anchor SMF includes the cause information. The intermediate SMF rejects the session corresponding to the session identifier.

Optionally, when the intermediate SMF determines that the session corresponding to the session ID is the LADN session, in other words, the current session is the LADN session, the intermediate SMF rejects the session corresponding to the session ID.

A manner in which the intermediate SMF determines that the current session is the LADN session is as follows: The session context sent by the anchor SMF to the intermediate SMF includes the first indication information, where the first indication information is used to indicate that the DNN corresponding to the current session is the LADN. Alternatively, the intermediate SMF determines, based on configuration information, that the session is the LADN session, where the configuration information may be, for example, information stored on the intermediate SMF. Alternatively, the intermediate SMF may determine, based on the second indication information sent by the AMF, that the session is the LADN session, where the second indication information is used to indicate that the UE is outside of the service area of the LADN. There may be a plurality of manners in which the intermediate SMF determines that the session is the LADN session. This is not limited in this embodiment.

Optionally, after the intermediate SMF determines, based on the first indication information sent by the anchor SMF, that the current session is the LADN session, the intermediate SMF rejects the session corresponding to the session identifier, terminates activation of the session, or terminates activation of the user plane of the session. The user plane of the session is a data transmission path.

S308: The intermediate SMF sends a first message to the AMF.

Optionally, the first message may be a session context response message.

Optionally, the first message includes the cause information for rejection of the corresponding session.

The intermediate SMF sends the cause information to the AMF, to notify the AMF that activation of the current session, namely, the LADN session, is rejected. Alternatively, the intermediate SMF sends the cause information to the AMF, to notify the AMF that activation of the user plane of the current session is rejected.

Optionally, the cause information is used to indicate a reason for which the session fails to be activated. For example, the reason may be: insertion of an intermediate SMF and an intermediate UPF is rejected for the LADN session.

In addition, it should be understood that the embodiment shown in FIG. 3 may further include a second implementation. In the second implementation, the anchor SMF determines that the current session is a LADN session, and rejects the session corresponding to the session identifier.

The second implementation includes step S301 to step S303 and step S309 to step S313. For detailed descriptions of step S301 to step S303, refer to the foregoing descriptions. Details are not described herein.

S309: The AMF sends a create session context request message to the intermediate SMF.

S310: The intermediate SMF sends a request message to the anchor SMF.

The intermediate SMF sends a session update request message or a session create request message to the anchor SMF. The session update request message or the session create request message includes the session identifier. Alternatively, the intermediate SMF sends a context request message to the anchor SMF. This process is similar to step S305. For details, refer to the description of step S305.

Optionally, the anchor SMF receives the session update request message or the session create request message sent by the intermediate SMF, and determines that the request message is used to request insertion of the intermediate SMF.

As an example, the anchor SMF receives the session update request or the session create request sent by the new intermediate SMF, and determines that the request message is used to insert the intermediate SMF.

S311: The anchor SMF rejects the session corresponding to the session identifier.

After the anchor SMF receives the request message from the intermediate SMF, when the anchor SMF determines that the session corresponding to the session identifier is the LADN session, the anchor SMF rejects the session. The rejecting the session may be specifically: the anchor SMF rejects activation of the session corresponding to the session identifier, or the anchor SMF rejects activation of a user plane of the session corresponding to the session identifier, or the anchor SMF subsequently releases the session corresponding to the session identifier, or the anchor SMF decides to deactivate (de-activate) the session corresponding to the session identifier. The anchor SMF may determine, based on a session context, that the current session is the LADN session. For example, the session context includes first indication information. The first indication information is used to indicate that the DNN corresponding to the current session is the LADN. Alternatively, the anchor SMF may determine the LADN session based on information configured on the anchor SMF. For example, the configured information may indicate which DNN stored by the anchor SMF is a LADN.

Optionally, if the request message in step 5310 is the context request message, when the session corresponding to the session identifier is the LADN session, the anchor SMF rejects transmission of a session context to the intermediate SMF, and includes cause information in a session context response message. The cause information may indicate: insertion of an intermediate SMF and a user plane function UPF is rejected for the LADN session.

Figure 4:
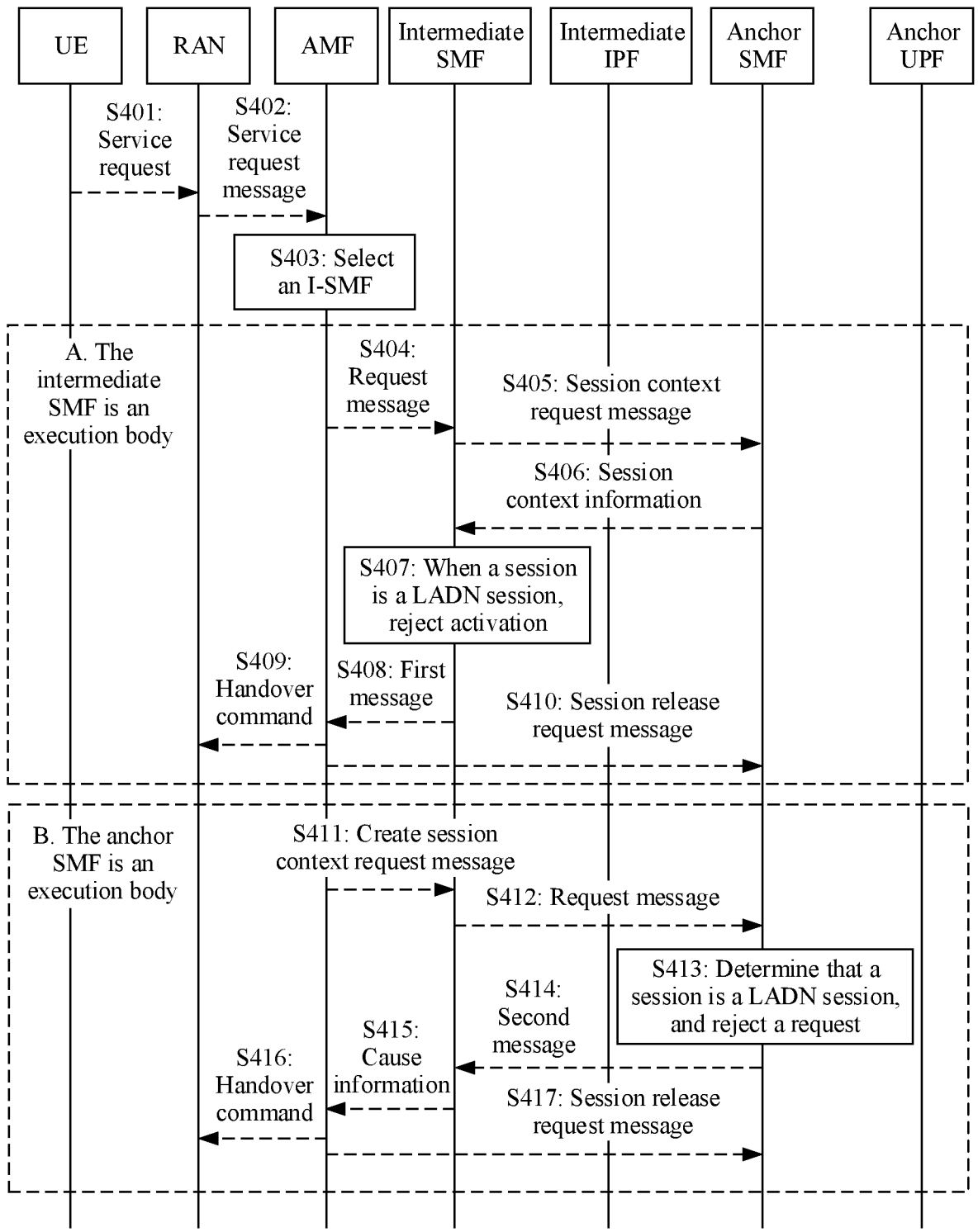
FIG. 4 is a schematic flowchart of another session handling method according to an embodiment of this application.

It should be noted that if the description of FIG. 3 is used as a reference for a corresponding description of FIG. 4, the description of session activation should be correspondingly understood as a description of session handover.

Optionally, there may be a plurality of manners in which the anchor SMF determines the LADN session. Specifically, the anchor SMF may determine the LADN session based on the information configured on the anchor SMF. Alternatively, the anchor SMF may determine, based on the session context, that the current session is the LADN session. For example, the anchor SMF may determine, based on the first indication information that is in the session context and that is used to indicate that the DNN corresponding to the current session is the LADN, that the current session is the LADN session. The configured information may be LADN information stored by the anchor SMF, for example, information indicating which DNN is a LADN.

S312: The anchor SMF sends a second message to the intermediate SMF.

Optionally, the second message may be a create session context response message.

The second message includes indication information or cause information. The indication information or the cause information is used to indicate that the session fails to be activated. Alternatively, the indication information or the cause information is used to indicate the intermediate SMF not to activate the user plane of the session. In other words, the intermediate SMF decides, based on the indication information, to reject activation of the user plane of the session. The user plane includes a transmission path between the RAN and a UPF, and/or a radio connection between the UE and the RAN. It should be noted that, in the embodiment of FIG. 4, the indication information should be correspondingly understood as being used to indicate that the session fails to be handed over.

It should be understood that the indication information may indicate corresponding information in different scenarios. For example, in a service request scenario, namely, a scenario of requesting activation of the session, the indication information is used to indicate that the session fails to be activated or is used to indicate the intermediate SMF not to activate the user plane of the session. In a handover scenario, the indication information is used to indicate that the session fails to be handed over.

Optionally, the second message further includes cause information for rejection of the current LADN session. For example, the cause may be: insertion of an intermediate SMF and an intermediate UPF is rejected for the LADN session.

Optionally, the second message sent by the anchor SMF to the intermediate SMF is used to indicate that the anchor SMF rejects activation of the session corresponding to the session identifier, namely, the LADN session. In other words, the anchor SMF sends a rejection message to the intermediate SMF, to notify the intermediate SMF that the current session fails to be activated or activation of the current session is terminated.

Optionally, the second message sent by the anchor SMF to the intermediate SMF carries cause information used to indicate that activation of the session is rejected or activation failure cause information used to indicate that the session fails to be activated. For example, the cause information may be: insertion of an intermediate SMF and an intermediate UPF is rejected for the LADN session.

S313: The intermediate SMF sends the indication information in the second message to the AMF.

Optionally, the intermediate SMF sends the cause information in the second message to the AMF.

FIG. 4 is a schematic flowchart of another session handling method according to an embodiment of this application.

For ease of understanding, a scenario to which this embodiment is applied is first briefly described.

This embodiment is applicable to a process in which UE moves. Specifically, the UE establishes a LADN session in a service area of a LADN. When the UE moves outside of a service area of an anchor SMF, the UE initiates a handover procedure (applicable to Xn handover and N2 handover) to request handover of the LADN session. In this case, AMF handover may be performed or may not be performed. In this embodiment, it is defined that insertion of an intermediate SMF and an intermediate UPF to continue to access a service of the LADN is not allowed. For example, in an implementation, it may be assumed that the service area of the LADN is a subset of the service area of the anchor SMF. In other words, the service area of the LADN is included in the service area of the anchor SMF. When the UE moves outside of the service area of the anchor SMF, the UE certainly moves outside of the service area of the LADN. A difference of this embodiment from the embodiment in FIG. 3 lies in that, if handover fails in a handover procedure, additional processing, such as release or deactivation of the LADN session, may be needed.

Step S401 to step S408 in this application are similar to step S301 to step S308 in FIG. 3. For related descriptions, refer to the foregoing descriptions. To avoid repetition, details are not described herein. It should be noted that, session activation described in the steps in FIG. 3 should be correspondingly understood as session handover in this embodiment.

In this embodiment, when the intermediate SMF is an execution body, in other words, the intermediate SMF decides to reject handover of the session, a corresponding procedure further includes the following step:

After the intermediate SMF rejects a session corresponding to a session identifier, the intermediate SMF sends a first message to the AMF, where the second message includes cause information for rejection of the current LADN session. That the intermediate SMF rejects the session corresponding to the session identifier means that the intermediate SMF rejects handover of the session corresponding to the session identifier. The cause information is used to indicate a reason for which the intermediate SMF rejects handover of the session corresponding to the session identifier.

After the AMF receives the first message, the method further includes the following steps.

S409: The AMF sends a handover command to the RAN.

Optionally, the handover command sent by the AMF to the RAN includes handover failure indication information. The handover failure indication information may be used to indicate that when the session corresponding to the session identifier is a LADN session, handover of the session fails or is not accepted, or a handover procedure is terminated.

Optionally, the handover command may further include failure cause information. For example, the failure cause information may be: insertion of an intermediate SMF and an intermediate UPF is rejected for the LADN session.

S410: The AMF sends a session release request message to the anchor SMF.

Optionally, after receiving the session release request message sent by the AMF, the anchor SMF deactivates or releases the LADN session. It should be understood that, for a process in which the anchor SMF releases or deactivates the LADN session, refer to the prior art. Details are not described herein.

In addition, when an execution body of this embodiment of this application is the anchor SMF, in other words, the anchor SMF decides to reject the session, the method further includes step S411 to step S417. Step S411 to step S415 are similar to step S309 to step S313 in FIG. 3. For detailed descriptions, refer to the foregoing descriptions. To avoid repetition, details are not described herein.

It should be understood that, in a session handover procedure in this embodiment, that the anchor SMF rejects the session is: the anchor SMF rejects handover of the session corresponding to the session identifier. When the execution body is the anchor SMF, the method further includes the following steps:

S416: The AMF sends a handover command to the RAN.

Optionally, the handover command sent by the AMF to the RAN includes failure indication information. The failure indication information may be used to indicate that handover of a session fails or is not accepted, or a handover procedure is terminated.

Optionally, the handover command may further include failure cause information. For example, the failure cause information may be: insertion of an intermediate SMF and an intermediate UPF is rejected for a LADN session.

S417: The AMF sends a session release request message to the anchor SMF.

Optionally, after receiving the session release request message sent by the AMF, the anchor AMF deactivates or releases the LADN session. It should be understood that, for a process in which the anchor SMF releases or deactivates the LADN session, refer to the prior art. Details are not described herein.

Figure 5:
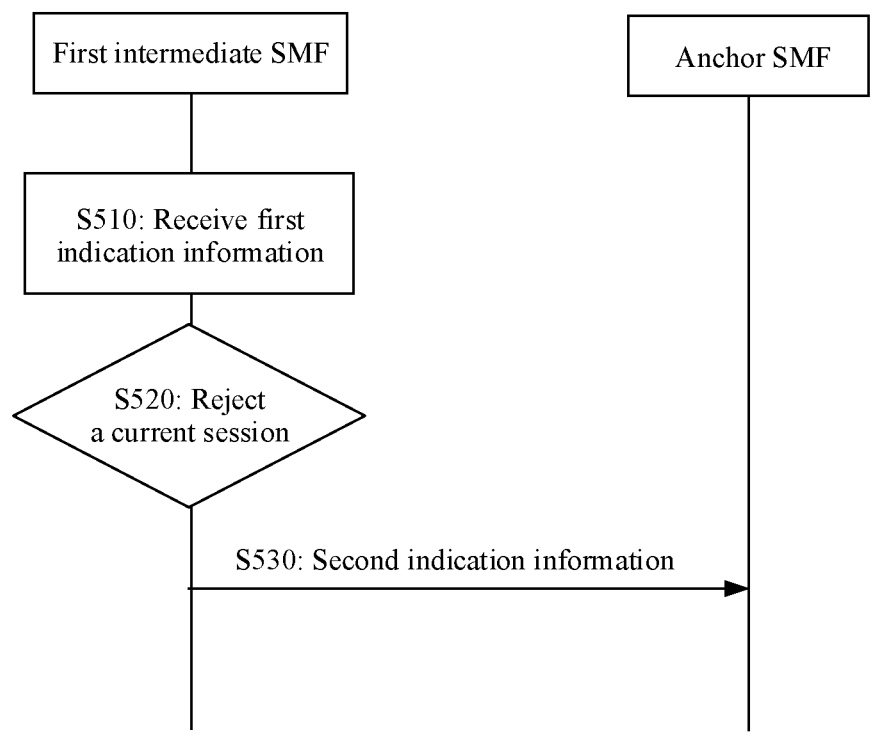
FIG. 5 is a schematic flowchart of still another session handling method according to an embodiment of this application.

FIG. 5 is a schematic flowchart of a session handling method according to an embodiment of this application.

The session handling method is applicable to a handover procedure triggered by movement of UE. For example, the session handling method is applicable to a process in which the UE moves outside of a service area of a LADN or the UE moves outside of a service area of an anchor SMF. The method includes step S510, step S520, and step S530.

S510: A first intermediate SMF receives first indication information. The first indication information is used to indicate that a DNN corresponding to a current session is a LADN, or is used to indicate that a current session is a LADN session.

Optionally, in a scenario in which an intermediate SMF is inserted, the first intermediate SMF is an inserted target intermediate SMF. In other words, there is no intermediate SMF for the LADN session before the UE moves. After the UE moves, especially after the UE moves outside of the service area of the anchor SMF, the intermediate SMF needs to be inserted. The intermediate SMF is the target intermediate SMF.

Optionally, in a scenario in which intermediate SMF handover needs to be performed, in other words, handover from a source intermediate SMF to a target intermediate SMF needs to be performed, the first intermediate SMF is the target intermediate SMF used after handover. The source intermediate SMF may be an intermediate SMF used before an intermediate SMF handover procedure is performed. The target intermediate SMF may be an intermediate SMF, namely, a new intermediate SMF, used after the intermediate SMF handover procedure is performed. It should be understood that, the target intermediate SMF may not be configured with information about the LADN.

It should be understood that the first intermediate SMF may be inserted, changed, or removed based on a requirement.

Optionally, the first indication information received by the first intermediate SMF may be sent by different network elements. For example, a network element that sends the first indication information may be a source AMF, a target AMF, the anchor SMF, or the source intermediate SMF. In a scenario in which AMF handover is performed, the source AMF is an AMF from which the UE is handed over, namely, an old AMF, and the source AMF is configured with the information about the LADN. The target AMF is an AMF to which the UE is handed over, namely, a new AMF, and the target AMF may not be configured with the information about the LADN. The information about the LADN may be, for example, a service area of the LADN or other information related to the LADN. Specific implementations in which the different network elements send the first indication information are described in detail below.

S520: The first intermediate SMF rejects the current session.

As an example, if the first intermediate SMF receives the first indication information, and a message received by the first intermediate SMF from the target AMF does not include indication information, for example, UE presence in LADN indication information, used to indicate whether the UE is in the service area of the LADN, the first intermediate SMF determines that the UE is outside of the service area of the LADN.

Optionally, when the first intermediate SMF determines that the UE is outside of the service area of the LADN, the first intermediate SMF may directly reject the session, in other words, the first intermediate SMF may release or deactivate the LADN session. Alternatively, the first SMF may send a message to the AMF, where the message carries cause information.

S530: Optionally, the first intermediate SMF sends second indication information to the anchor SMF.

It should be noted that if the first intermediate SMF deactivates the LADN session, the first intermediate SMF may not send the second indication information to the anchor SMF.

Optionally, if the first intermediate SMF determines that the UE moves outside of the service area of the LADN, the first intermediate SMF sends, to the anchor SMF, the second indication information used to indicate that the UE is outside of the service area of the LADN.

Specifically, when the target AMF is not configured with the information about the LADN, the target AMF does not send, to the first intermediate SMF, the indication information indicating whether the UE is in the service area of the LADN. Because the first intermediate SMF learns, based on the first indication information, that the current session is the LADN session, the first intermediate SMF may determine that the UE moves outside of the service area of the LADN. Then, the first intermediate SMF sends the second indication information to the anchor SMF.

Optionally, when a second message includes the indication information indicating that the UE is outside of the service area of the LADN, the first intermediate SMF forwards the indication information to the anchor SMF. Specifically, when the target AMF is configured with the information about the LADN, the target AMF may determine, based on the service area of the LADN and a location of the UE, that the UE moves outside of the service area of the LADN, and the target AMF may send, to the first intermediate SMF, the second indication information used to indicate that the UE moves outside of the service area of the LADN.

Optionally, for example, the second indication information may be: a UE presence in LADN indication is "IN" or "OUT". When the indication is "OUT", it indicates that the UE is outside of the service area of the LADN. When the indication is "IN", it indicates that the UE is in the service area of the LADN.

It should be understood that the anchor SMF learns, based on the second indication information, that the UE moves outside of the service area of the LADN, and may further release or deactivate the LADN session established by the UE. Specifically, the anchor SMF may send, to the target AMF, a message used to deactivate the LADN session, or the anchor SMF may send, to an A-UPF, a message including information used to indicate to release an N3 tunnel of the LADN session.

Figure 6:
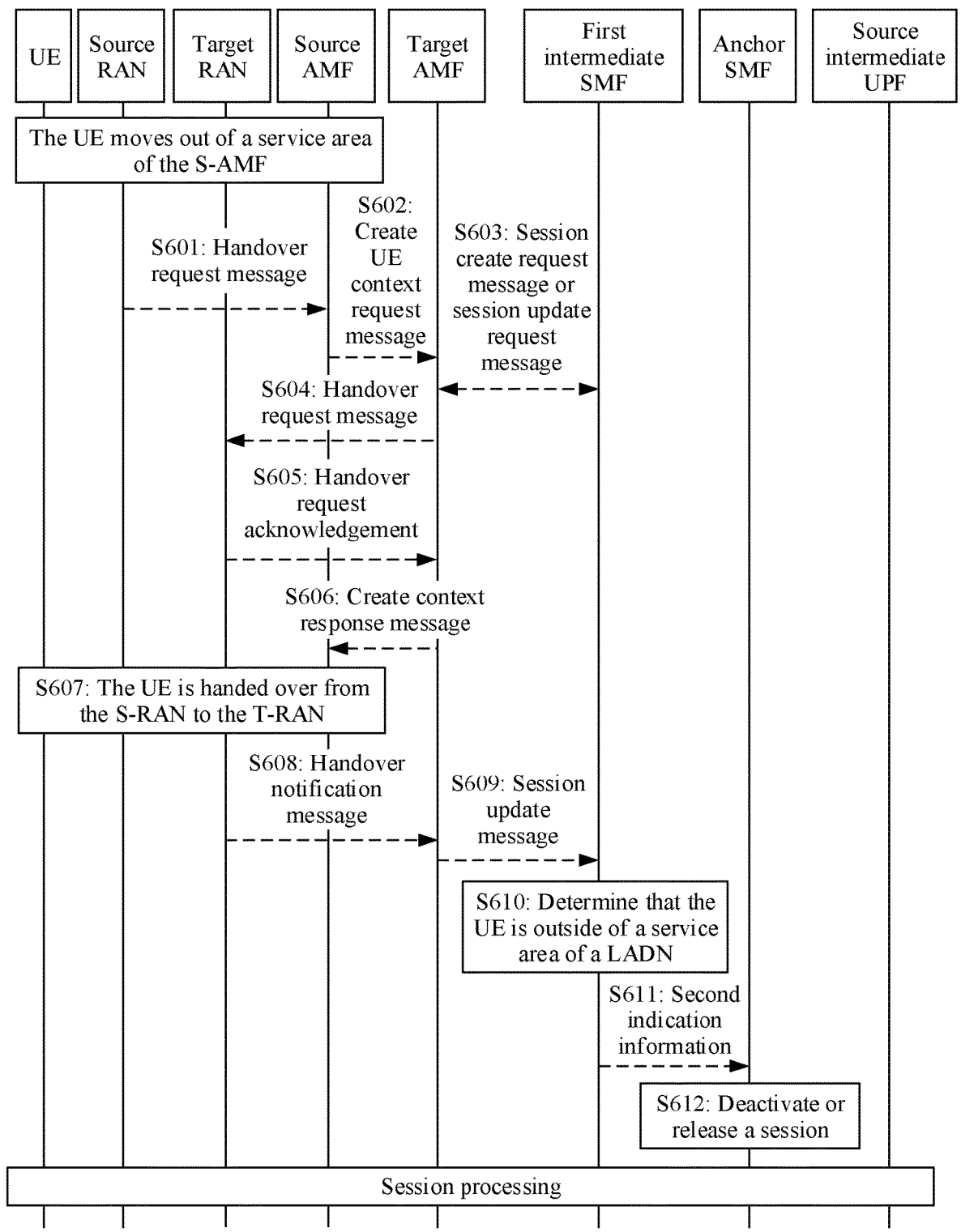
FIG. 6 is a schematic flowchart of yet another session handling method according to an embodiment of this application.

FIG. 6 is a schematic flowchart of a session handling method according to an embodiment of this application.

For ease of understanding, a scenario and network elements in FIG. 6 are first briefly described.

This embodiment is applicable to a scenario in which AMF handover is performed and an intermediate SMF is unchanged. Before AMF handover is performed, a source AMF manages an access and mobility service of UE, and a RAN to which the UE is attached is connected, via an intermediate UPF controlled by a first intermediate SMF, to an anchor UPF controlled by an anchor SMF. After AMF handover is performed for the UE, the source AMF detects that the source AMF can no longer serve the UE. The source AMF selects a target AMF as a new AMF to serve the UE. In other words, AMF handover is performed. In this case, handover is not performed on the first intermediate SMF. In other words, the RAN to which the UE is attached is still connected, via the intermediate UPF controlled by the first intermediate SMF, to the anchor UPF controlled by the anchor SMF. A specific implementation procedure of this embodiment is shown in FIG. 6, and descriptions of steps are as follows.

S601: A source RAN sends handover request message to a target RAN.

For example, when the UE is farther away from the source RAN but is closer to the target RAN, the UE may obtain a better signal from the target RAN. Therefore, the source RAN selects the target RAN, and sends the handover request message to the target RAN.

Optionally, the handover request message is used to request, from the target RAN, handover of the UE to the target RAN. The handover request message may carry information of a to-be-handed-over LADN session, for example, a session identifier corresponding to the LADN session or a list of session identifiers corresponding to a plurality of LADN sessions. It should be understood that, the handover request message may further include a session identifier corresponding to a non-LADN session, but the session identifier corresponding to the non-LADN session is not involved in this embodiment of this application. Therefore, no special description is provided. A quantity of LADN sessions is not limited in this embodiment.

S602: The source AMF sends a create UE context request message to the target AMF.

Optionally, when it is detected that the source AMF can no longer serve the UE, the source AMF selects the target AMF as a new AMF to serve the UE. For a procedure of selecting the target AMF, refer to an existing procedure. Details are not described herein.

Optionally, the create UE context request message sent by the source AMF to the target AMF is used to request the target AMF to create a UE context. The create UE context request message may carry UE context information stored on the source AMF. The UE context information may include, for example, a DNN and an SMF that correspond to the session identifier of the LADN session.

S603: The target AMF sends a session create request message or a session update request message to the first intermediate SMF.

Optionally, in a handover procedure of the UE, handover is not performed on the first intermediate SMF. The first intermediate SMF is configured with information about a LADN. For example, the information about the LADN may be: a DNN corresponding to a current session is a LADN or a current session is a LADN session.

Optionally, the session create request message or the session update request message includes an identifier of a first AMF.

Optionally, the first intermediate SMF sends, to the target AMF, a response message for the session create request message or the session update request message. When there is an Xn interface between the S-RAN and the T-RAN, the response message sent by the first intermediate SMF to the target AMF may further include a direct forwarding indication, to indicate the source RAN to directly forward data to the target RAN. Alternatively, the response message may be uplink tunnel information, for example, an IP address or a tunnel endpoint, of the I-UPF selected and inserted by the first intermediate SMF.

It should be noted that the following steps (step S604 to step S612) are all described for a single session identifier. In a case in which the handover request message includes a plurality of session identifiers, step S604 to step S612 are performed for a session corresponding to each of the session identifiers.

S604: The target AMF sends a handover request message to the target RAN.

Optionally, after receiving the uplink tunnel information that is of the I-UPF and that is sent by the first intermediate SMF, the target AMF sends the handover request message to the target RAN. The request message is used to request the target RAN to enable the UE to access the target RAN.

Optionally, the handover request message may carry the uplink tunnel information of the I-UPF.

Optionally, when a first session corresponds to a plurality of I-UPFs, the handover request message carries uplink tunnel information of the plurality of I-UPFs.

S605: The target RAN sends a handover request acknowledgement message to the target AMF.

For example, after receiving the handover request message sent by the target AMF, the target RAN creates a corresponding resource on the target RAN, and sends the handover request acknowledgement message to the target AMF.

Optionally, the resource created by the target RAN may include an N3 tunnel downlink resource. The N3 tunnel downlink resource may be, for example, an IP address of the target RAN or an N3 tunnel endpoint number.

Optionally, the handover request acknowledgement message sent by the target RAN to the target AMF includes the N3 tunnel downlink resource created by the target RAN.

S606: The target AMF sends a create context response message to the source AMF.

For example, after resources on the target RAN and the target AMF are created, the target AMF sends the create context response message to the source AMF. The create context response message is used by the target AMF to notify the source AMF that the resources on the target RAN and the target AMF have been created.

Optionally, the create context response message sent by the target AMF to the source AMF may be further used to request the source RAN in the LADN to perform an operation of handing over the UE from the source RAN to the target RAN.

S607: The UE is handed over from the source RAN to the target RAN.

For a specific procedure in which the UE is handed over from the source RAN to the target RAN, refer to an existing procedure. Details are not described herein.

S608: The target RAN sends a handover notification message to the target AMF.

For example, the target RAN sends the handover notification message to the target AMF after the UE completes the handover procedure. The handover notification message is used to notify the target AMF that the UE has been successfully handed over to the target RAN.

S609: The target AMF sends a session update message to the first intermediate SMF.

Optionally, the session create request message or the session update request message is a third message.

Optionally, if the target AMF is not configured with information related to the LADN, the session update message sent to the first intermediate SMF does not include indication information used to indicate that the UE is outside of a service area of the LADN.

S610: The first intermediate SMF determines that the UE is outside of the service area of the LADN.

It should be understood that, the first intermediate SMF may determine that the current session is the LADN session or the DNN corresponding to the current session is the LADN. Specifically, a manner in which the first intermediate SMF learns that the current session is the LADN session or the DNN corresponding to the current session is the LADN may include: The source AMF notifies the first intermediate SMF of the information about the LADN. Alternatively, when the first intermediate SMF is inserted, the first intermediate SMF obtains a session context from the anchor SMF, where the session context includes indication information indicating that the DNN corresponding to the current session is the LADN or the current session is the LADN session. It should be understood that, the first intermediate SMF may learn the information about the LADN in a plurality of other manners. This is not limited in this embodiment.

Optionally, when a second message that is sent by the target AMF and that is received by the first intermediate SMF does not include the indication information used to indicate that the UE is outside of the service area of the LADN, because the first intermediate SMF may determine that the current session is the LADN session, the first intermediate SMF determines that the UE is outside of the service area of the LADN. The second message may be the session update message.

Optionally, when the first intermediate SMF determines that the UE is outside of the service area of the LADN, the first intermediate SMF may directly reject the session, in other words, the first intermediate SMF may release or deactivate the LADN session. In this case, step S611 and step S612 may be skipped in this embodiment. In addition, the first intermediate SMF may send a notification message to the AMF, where the message carries cause information.

S611: The first intermediate SMF sends second indication information to the anchor SMF.

Optionally, when the first intermediate SMF does not release or deactivate the session, the anchor SMF may perform an operation of releasing or deactivating the session.

Optionally, after determining that the UE moves outside of the LADN, the first intermediate SMF sends the second indication information to a second SMF. The second indication information is used to indicate that the UE moves outside of the LADN. The second indication information may be: a UE presence in LADN indication is "OUT".

S612: The anchor SMF performs the operation of releasing or deactivating the first session.

Optionally, when the first intermediate SMF does not release or deactivate the session, the anchor SMF may perform the operation of releasing or deactivating the session.

For example, the second SMF learns, based on the second indication information, that the UE moves outside of the LADN, and may release or deactivate the LADN session established by the UE. Specifically, the SMF may send, to the AMF, a message used to deactivate the LADN session, or the SMF may send, to a UPF, a message including information used to indicate to release an N3 tunnel of the LADN session.

For the operation that is of releasing or deactivating the session and that is performed by the second SMF, refer to the prior art. Details are not described herein.

Figure 7:
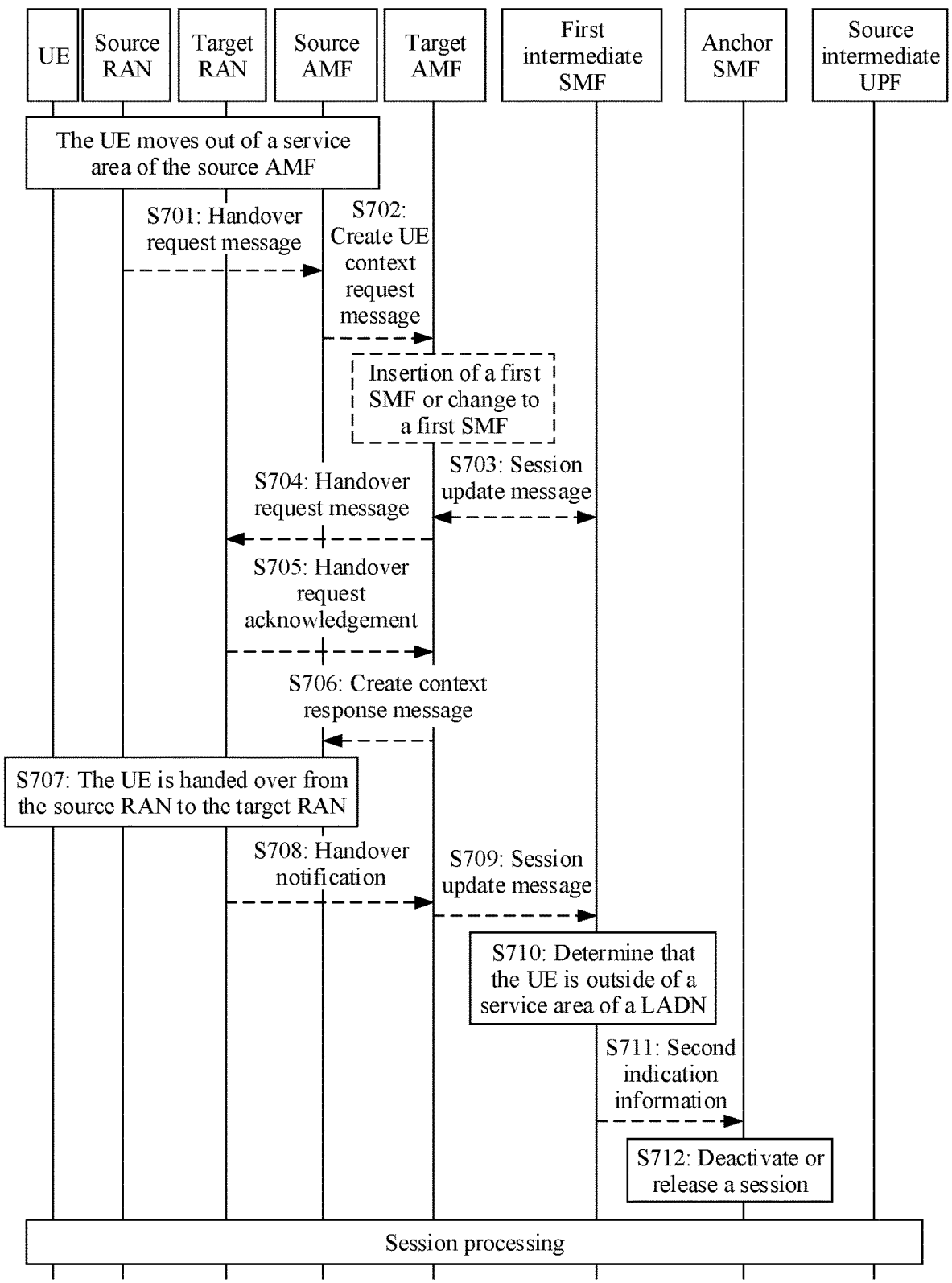
FIG. 7 is a schematic flowchart of still yet another session handling method according to an embodiment of this application.

FIG. 7 is a schematic flowchart of another session handling method according to an embodiment of this application.

For ease of understanding, a scenario to which this embodiment may be applied is briefly described.

This embodiment is applicable to a scenario in which AMF handover is performed and an intermediate SMF used after handover is an inserted new intermediate SMF. Specifically, a handover procedure is triggered by movement of UE. AMF handover is performed. A source AMF (namely, an old AMF) is configured with information about a LADN, and the UE establishes a LADN session in a service area of a LADN. After handover is performed, the UE is handed over from the source AMF to a target AMF (namely, a new AMF). The target AMF is not configured with the information about the LADN. In addition, the handover procedure further includes the following two specific scenarios: (1) There is no intermediate SMF for the LADN session before handover (in other words, no source intermediate SMF is involved). After handover, the UE moves outside of a service area of an anchor SMF. Therefore, a first intermediate SMF needs to be inserted. (2) There is an intermediate SMF (namely, a source intermediate SMF) for the LADN session before handover. After handover, handover from the source intermediate SMF to a new intermediate SMF, namely, a target intermediate SMF, needs to be performed. A specific implementation procedure of this embodiment is shown in FIG. 7, and descriptions of steps are as follows.

An interaction process of network elements in FIG. 7 is as follows.

Step S701 is similar to step S601 in FIG. 6. For a specific implementation method, refer to the foregoing description of step S601. To avoid repetition, details are not described herein.

S702: The source AMF sends a create UE context request message to the target AMF.

Optionally, when it is detected that the source AMF can no longer serve the UE, the source AMF selects the target AMF as the new AMF to serve the UE. For a procedure of selecting a first AMF, refer to an existing procedure. Details are not described herein.

Optionally, the create UE context request message is used to request the target AMF to create a UE context. The create UE context request message may further carry UE context information stored on the source AMF. The UE context information may include, for example, a DNN and an SMF that correspond to a PDU session identifier.

Optionally, when a session is a LADN session, first indication information is carried in the create UE context request message. The first indication information is used to indicate that a DNN of the current session is a LADN or the current session is a LADN session. It should be understood that when the target AMF is not configured with information about the LADN, the target AMF may learn, based on the first indication information, that the current session is the LADN session.

Optionally, after the target AMF learns, based on the first indication information, that the current session is the LADN session, if the target AMF is configured with information about a service area of the LADN, the target AMF may determine, based on a location of the UE and the service area of the LADN, whether the UE moves outside of the service area of the LADN.

Optionally, after the target AMF learns, based on the first indication information, that the current session is the LADN session, if the target AMF is not configured with information such as a service area of the LADN, the target AMF may determine that the UE is outside of the service area of the LADN.

Step S703 to step S708 are similar to step S603 to step S608 in FIG. 6. For a specific implementation method, refer to the foregoing descriptions of the corresponding steps. To avoid repetition, details are not described herein.

The following describes step S709 to step S712 in FIG. 7.

S709: The target AMF sends a session update message to the first intermediate SMF, where the session update message includes second indication information used to indicate that the UE is outside of the service area of the LADN.

Optionally, the session create request message or the session update request message is a third message.

For example, if the target AMF determines, in step S702, that the UE is outside of the service area of the LADN, the second message sent to the first intermediate SMF includes the second indication information. The second indication information is used to notify the first SMF that the UE is outside of the service area of the LADN. For example, the second indication information may be: a UE presence in LADN indication is "OUT".

It should be understood that when there is an intermediate SMF for the LADN session before handover and the UE moves outside of a service area of a source intermediate SMF during movement, the first intermediate SMF is a target intermediate SMF used after handover. When there is no intermediate SMF for the LADN session before handover and the UE moves outside of a service area of an anchor SMF during movement, the first intermediate SMF is an inserted target intermediate SMF.

S710: The first intermediate SMF rejects the current session.

As an example, the first intermediate SMF learns, through step S704 and step S705, that the current session is the LADN session or the DNN corresponding to the current session is the LADN. If the message that is sent by the target AMF and that is received by the first intermediate SMF in step S709 does not include the indication information used to indicate that the UE is outside of the service area of the LADN, the first intermediate SMF may determine that the UE is outside of the service area of the LADN.

As another example, after the target AMF learns, in step S702 based on the first indication information, that the current session is the LADN session, if the target AMF is not configured with information such as the service area of the LADN, the target AMF may determine that the UE is outside of the service area of the LADN. If the message that is sent by the target AMF and that is received by the first intermediate SMF in step S709 includes the indication information used to indicate that the UE is outside of the service area of the LADN, the first intermediate SMF may determine that the UE is outside of the service area of the LADN.

Optionally, when the first intermediate SMF determines that the UE is outside of the service area of the LADN, the first intermediate SMF may directly reject the current session, in other words, the first intermediate SMF may release or deactivate the LADN session. In this case, step S711 and step S712 may be skipped in this embodiment.

S711: The first intermediate SMF sends the second indication information to the anchor SMF.

Optionally, when the first intermediate SMF does not release or deactivate the session, the anchor SMF may perform an operation of releasing or deactivating the session.

Optionally, after determining that the UE moves outside of the LADN, the first intermediate SMF sends the second indication information to a second SMF. The second indication information is used to indicate that the UE moves outside of the LADN. The second indication information may be: a UE presence in LADN indication is "OUT".

S712: The anchor SMF performs the operation of releasing or deactivating the first session.

Optionally, when the first intermediate SMF does not release or deactivate the session, the anchor SMF may perform the operation of releasing or deactivating the session.

For example, the second SMF learns, based on the second indication information, that the UE moves outside of the LADN, and may release or deactivate the LADN session established by the UE. Specifically, the SMF may send, to the AMF, a message used to deactivate the LADN session, or the SMF may send, to a UPF, a message including information used to indicate to release an N3 tunnel of the LADN session.

For the operation that is of releasing or deactivating the session and that is performed by the second SMF, refer to the prior art. Details are not described herein.

In this embodiment, the source AMF sends indication information of a LADN session to the target AMF, and the target AMF may learn that the current session is the LADN session. Then, the intermediate SMF sends, to the anchor SMF, the indication information indicating that the UE moves outside of the service area of the LADN. In this way, in a scenario in which there are two SMFs, the intermediate SMF or the anchor SMF may deactivate or release the current session, to save service resources of the LADN.

Figure 8A:
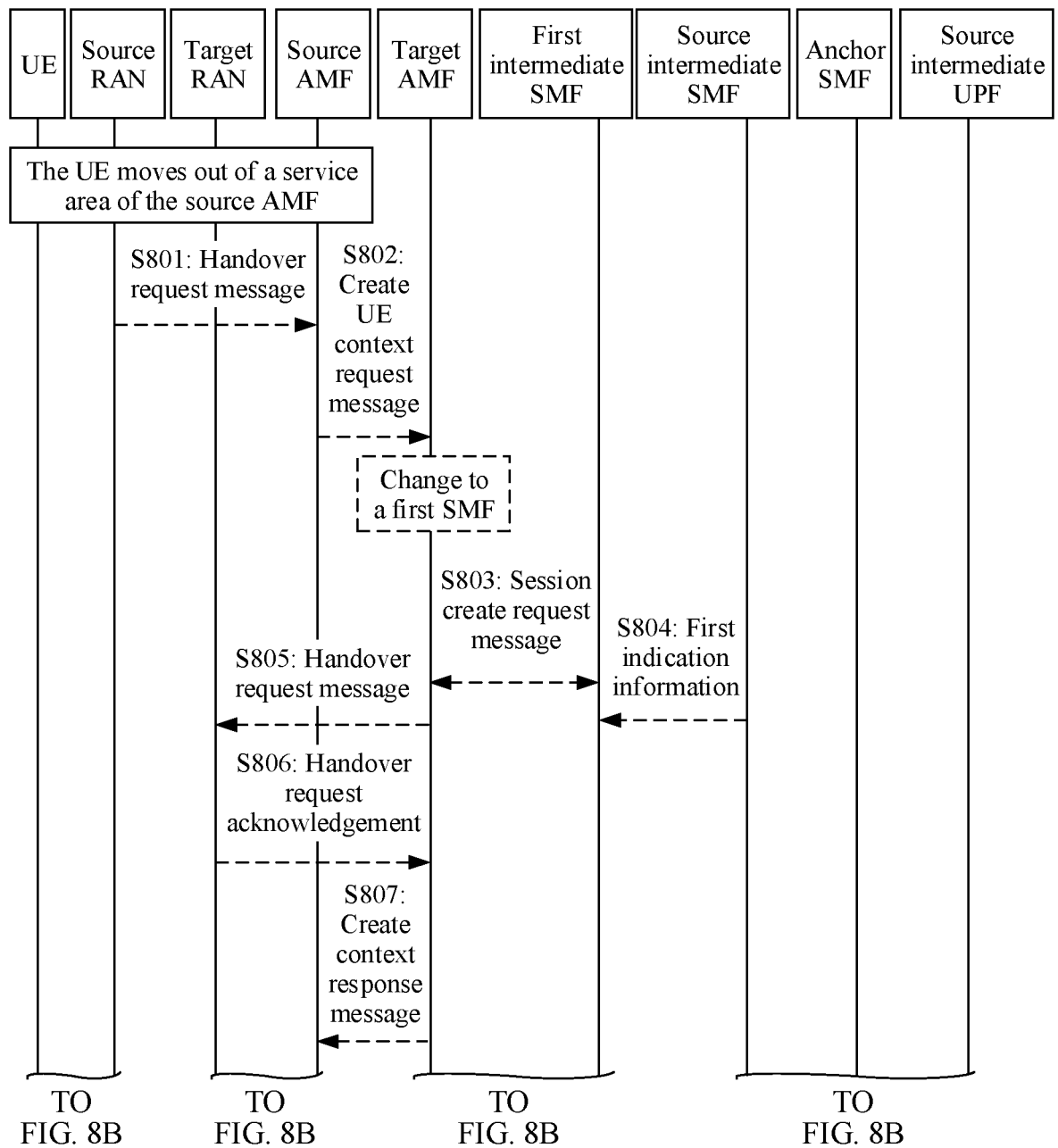
FIG. 8A and FIG. 8B are a schematic flowchart of a further session handling method according to an embodiment of this application.
Figure 8B:
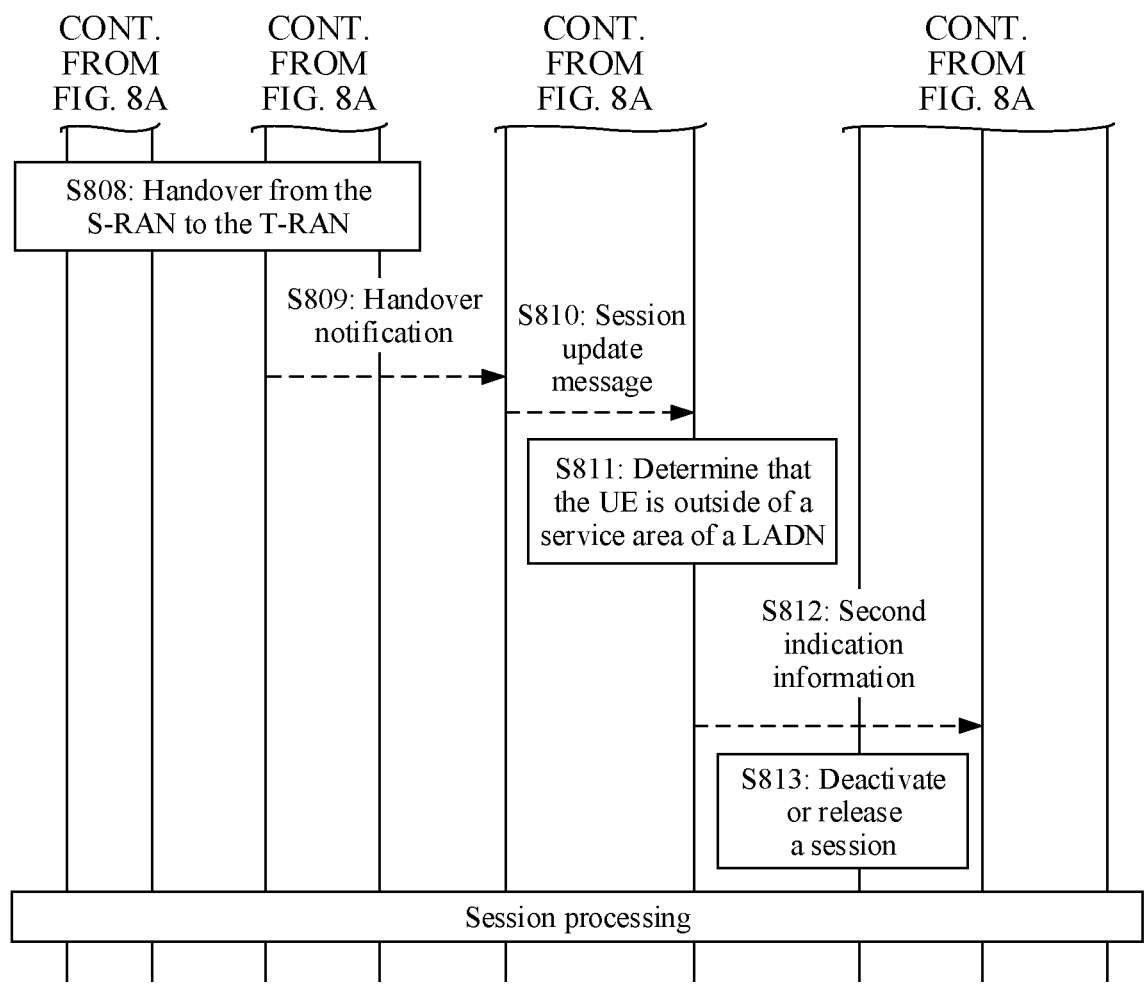

FIG. 8A and FIG. 8B are a schematic flowchart of still another session handling method according to an embodiment of this application. The method includes step S801 to step S813. For ease of understanding, a scenario to which this embodiment may be applied is briefly described.

This embodiment is applicable to a handover procedure triggered by movement of UE. AMF handover is performed. An AMF used before handover is a source AMF, and the source AMF is configured with information about a LADN. An AMF used after handover is a target AMF, and the target AMF is not configured with the information about the LADN. Before handover, the UE establishes a LADN session in a service area of the LADN. In addition, there is an intermediate SMF (namely, a source intermediate SMF) for the LADN session before handover. After handover, the LADN session needs to be handed over to a new intermediate SMF (namely, a target intermediate SMF). A specific implementation procedure of this embodiment is shown in FIG. 8, and descriptions of steps are as follows.

Step S801 to step S803 are similar to step S601 to step S603 in FIG. 6. For a specific implementation method, refer to the foregoing descriptions of step S601 to step S603. To avoid repetition, details are not described herein.

S804: The source intermediate SMF sends first indication information to the target intermediate SMF.

Optionally, the source intermediate SMF may send a session context to the target SMF. The session context includes the first indication information, and the first indication information is used to indicate that a DNN corresponding to a current session is a LADN or a current session is a LADN session. In other words, the target intermediate SMF may learn, based on the source intermediate SMF, that the current session is the LADN session.

Optionally, a manner in which the source intermediate SMF learns that the current session is the LADN session or the source intermediate SMF obtains the first indication information may include: When the source intermediate SMF is inserted, the source intermediate SMF obtains the session context from an anchor SMF, where the session context includes the indication information used to indicate that the DNN corresponding to the current session is the LADN or the current session is the LADN session. Alternatively, in an intermediate SMF handover scenario, the source intermediate SMF obtains the session context from an intermediate SMF used before handover, where the session context includes the indication information used to indicate that the DNN corresponding to the current session is the LADN or the current session is the LADN session. Alternatively, when the source intermediate SMF is inserted, the source AMF notifies the source intermediate SMF of the indication information used to indicate that the DNN corresponding to the current session is the LADN or the current session is LADN session. Alternatively, the source intermediate SMF may be preconfigured with information related to the LADN session. It should be understood that, there may further be a plurality of other manners in which the source intermediate SMF learns that the current session is the LADN session or the source intermediate SMF obtains the first indication information. This is not limited in this application.

S805 to S809 are similar to S604 to S608 in FIG. 6. For a specific implementation process, refer to the foregoing descriptions of S604 to S608. To avoid repetition, details are not described herein.

S810: The target AMF sends a session update message to a first intermediate SMF.

Optionally, the session create request message or the session update request message is a third message.

Optionally, the target AMF is not configured with related information about the LADN. Therefore, the session update message sent to the target intermediate SMF does not include indication information indicating whether the UE moves outside of the LADN.

Optionally, the target intermediate SMF learns, based on the first indication information in step S804, that the current session is the LADN session. Therefore, when the target intermediate SMF does not receive the indication information that is sent by the target AMF and that indicates whether the UE moves outside of the LADN, the target intermediate SMF may determine that the UE has moved outside of a service area of the LADN.

S811: The first intermediate SMF rejects the current session.

As an example, the first intermediate SMF learns, through step S804, that the current session is the LADN session or the DNN corresponding to the current session is the LADN. If a second message that is sent by the target AMF and that is received by the first intermediate SMF in step S810 does not include indication information used to indicate that the UE is not in the service area of the LADN, the first intermediate SMF determines that the UE is not in the service area of the LADN.

Optionally, when the first intermediate SMF determines that the UE is not in the service area of the LADN, the first intermediate SMF may directly reject the session, in other words, the first intermediate SMF may release or deactivate the LADN session. In this case, step S812 and step S813 may be skipped in this embodiment. In addition, the first SMF may send a message to the AMF, where the message carries cause information. For a specific method, refer to the descriptions in Embodiment 3 and Embodiment 4.

S812: The first intermediate SMF sends second indication information to the anchor SMF.

Optionally, when the first intermediate SMF does not release or deactivate the session, the anchor SMF may perform an operation of releasing or deactivating the session.

Optionally, after determining that the UE moves outside of the LADN, the first intermediate SMF sends the second indication information to a second SMF. The second indication information is used to indicate that the UE moves outside of the LADN. The second indication information may be: a UE presence in LADN indication is "OUT".

S813: The anchor SMF performs the operation of releasing or deactivating the first session.

Optionally, when the first intermediate SMF does not release or deactivate the session, the anchor SMF may perform the operation of releasing or deactivating the session.

For example, the second SMF learns, based on the second indication information, that the UE moves outside of the LADN, and may release or deactivate the LADN session established by the UE. Specifically, the SMF may send, to the AMF, a message used to deactivate the LADN session, or the SMF may send, to a UPF, a message including information used to indicate to release an N3 tunnel of the LADN session.

For the operation that is of releasing or deactivating the session and that is performed by the second SMF, refer to the prior art. Details are not described herein.

Figure 9:
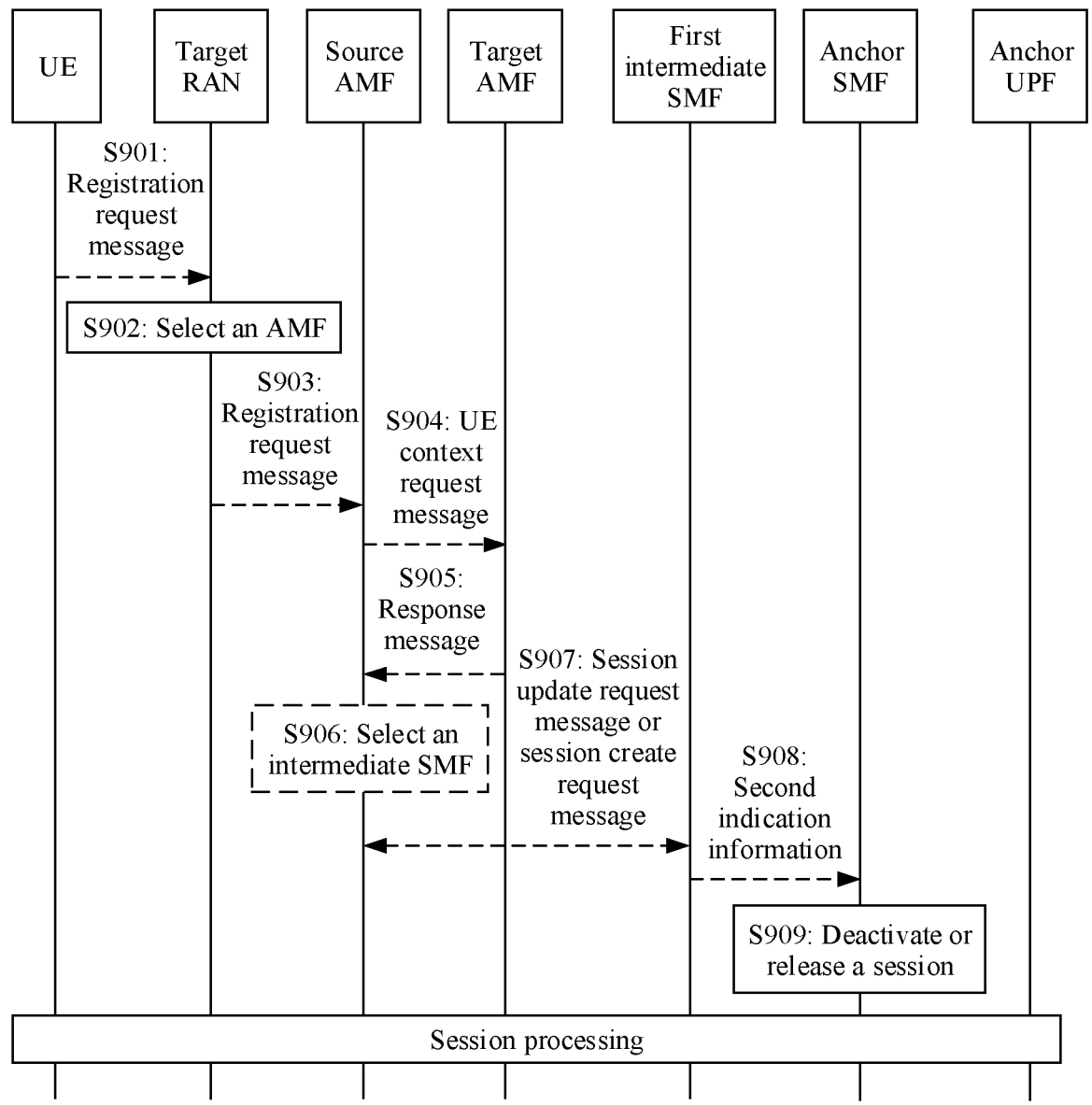
FIG. 9 is a schematic flowchart of a still further session handling method according to an embodiment of this application.

FIG. 9 is a schematic flowchart of yet another session handling method according to an embodiment of this application.

For ease of understanding, a scenario to which this embodiment is applied is first briefly described.

This embodiment is applicable to a process in which UE in idle mode moves. Specifically, after the UE moves outside of a service area of a source AMF, a re-registration procedure is initiated. The UE is handed over from the source AMF to a target AMF. The source AMF is configured with information about a LADN, but the target AMF is not configured with the information about the LADN. When the UE is served by the source AMF, the UE establishes a session in a service area of the LADN. The session is deactivated when the UE changes to idle mode. The UE includes a session identifier in a registration request for initiating re-registration, to request activation of the session. After the UE moves, an intermediate SMF needs to be changed or inserted.

The session handling method shown in FIG. 9 includes step S901 to step S909.

S901: The UE sends a registration request message to a target RAN.

For example, after moving into the target RAN, the UE in idle mode initiates a registration request to the target RAN that the UE requests to access.

Optionally, the registration request message sent by the UE carries an identifier of a to-be-activated session and a corresponding context. A DNN corresponding to the session identifier may be a LADN or another network type. This embodiment is described for only a case in which the DNN corresponding to the session identifier is the LADN.

S902: The target RAN selects the target AMF.

Optionally, after receiving the registration request message sent by the UE, the target RAN selects the target AMF to serve the UE. For a procedure in which the T-RAN selects the target AMF, refer to an existing procedure. Details are not described herein.

S903: The target RAN sends the registration request message to the target AMF.

Optionally, the target RAN forwards the registration request message received in step S901 to the target AMF.

Optionally, the registration request message may include information such as the identifier of the to-be-activated session. The DNN corresponding to the session identifier is the LADN.

S904: The target AMF sends a context request message to the source AMF.

Optionally, when the registration request message received by the target AMF includes the information such as the identifier of the to-be-activated session, the target AMF requests session context information of the UE from the source AMF.

S905: The source AMF sends a response message for the context request message to the target AMF.

Optionally, the response message includes first indication information indicating that, for example, the DNN corresponding to the session identifier of the LADN session is a LADN or the session is a LADN session.

S906: The target AMF selects a first intermediate SMF.

Optionally, the target AMF may learn information about the LADN based on the received first indication information.

Optionally, when the target AMF is not configured with the information about the LADN, the target AMF determines that the UE moves outside of a service area of the LADN.

Optionally, in a scenario in which intermediate SMF handover needs to be performed, in other words, a source intermediate SMF is an intermediate SMF used before handover and a target intermediate SMF is an intermediate SMF used after handover, the first intermediate SMF is the target intermediate SMF used after handover.

Optionally, when there is no intermediate SMF for a session before a handover procedure of the UE, the first intermediate SMF is an inserted target intermediate SMF.

It should be understood that for a procedure in which the target AMF selects the first intermediate SMF, refer to an existing procedure. Details are not described herein.

S907: The target AMF sends a session create request message or a session update request message to the first intermediate SMF.

It should be understood that after the first AMF selects and inserts the first intermediate SMF, or handovers to the first intermediate SMF, the first AMF sends the corresponding session create request message or session update request message to the first intermediate SMF.

Optionally, the target AMF may determine, based on the first indication information received in step S905, that the session is the LADN session. When the target AMF is not configured with the information about the LADN, the target AMF may determine that the UE moves outside of the service area of the LADN. In this case, the target AMF may include second indication information in the session create request message or session update request message. The second indication information is used to indicate that the UE is outside of the service area of the LADN. For example, the second indication information may be: a UE presence in LADN indication is "OUT".

Optionally, the second indication information may be included in the session create request message or session update request message sent by the target AMF to the first intermediate SMF. Specifically, in a scenario in which intermediate SMF handover is performed, the target AMF sends the session update request message to the first intermediate SMF. In a scenario in which the intermediate SMF is newly inserted, the target AMF sends a session handover request message to the first intermediate SMF.

Optionally, the session create request message or session update request message sent by the target AMF to the first intermediate SMF may carry, for example, information that the UE presence in LADN indication is "OUT".

Optionally, the target AMF may further send the first indication information to the first intermediate SMF, to notify the first intermediate SMF that the DNN corresponding to the current session identifier is the LADN or the current session is the LADN session.

S908: The first intermediate SMF sends the second indication information to the anchor SMF.

Optionally, after receiving the second indication information sent by the target AMF, the first intermediate SMF forwards the second indication information to the anchor SMF. The second indication information is used to indicate that the UE moves outside of the service area of the LADN.

Optionally, the first intermediate SMF forwards the session create request message or session update request message received in step S907 to the anchor SMF. The session create request message or session update request message carries the second indication information. For example, the session create request message or session update request message carries the indication information indicating that UE present in LADN is "OUT".

S909: The anchor SMF deactivates or releases the session.

Optionally, after the anchor SMF determines, based on the second indication information, that the UE moves outside of the service area of the LADN, the anchor SMF triggers an operation of deactivating or releasing the session. For a process in which the anchor SMF deactivates or releases the session, refer to an existing procedure. Details are not described herein.

Figure 10:
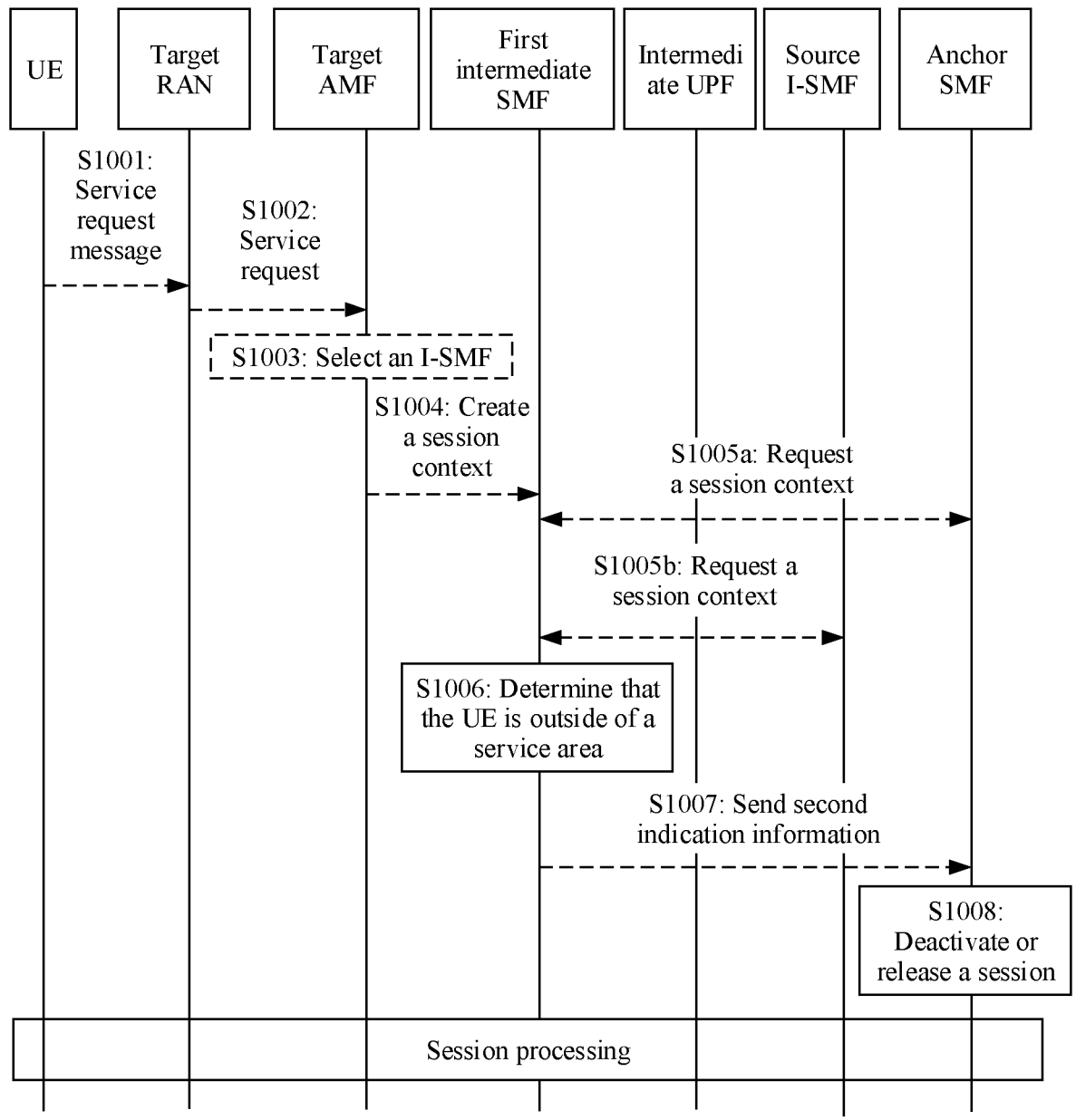
FIG. 10 is a schematic flowchart of a yet further session handling method according to an embodiment of this application.

FIG. 10 is a schematic flowchart of still yet another session handling method according to an embodiment of this application.

For ease of understanding, a scenario to which this embodiment is applied is first briefly described.

This embodiment is applicable to a scenario in which UE in idle mode initiates a service request after the UE in idle mode moves. Specifically, during movement, the UE in idle mode moves outside of a service area of a source AMF, and initiates a service request procedure. An AMF is changed from the source AMF to a target AMF. When the UE is served by the source AMF, the UE establishes a session in a service area of a LADN. However, the session is deactivated when the UE changes to idle mode. In addition, the source AMF is configured with information about the LADN, but the target AMF is not configured with the information about the LADN. In this embodiment, after the UE moves, an intermediate SMF needs to be changed or inserted.

The session handling method shown in FIG. 10 includes step S1001 to step S1009.

It should be understood that, AMF handover is performed, in other words, handover from the source AMF that originally serves the UE to the target AMF is performed. The target AMF may not be configured with the information about the LADN.

It should be also understood that after the UE moves outside of a service area of an anchor SMF, the target AMF may select and insert a first intermediate SMF. The first intermediate SMF selects an intermediate UPF to be connected to an anchor UPF. Alternatively, after the UE moves outside of a service area of a source intermediate SMF, the target AMF may re-select an intermediate SMF. The first intermediate SMF selects an intermediate UPF to be connected to an anchor UPF.

S1001: The UE sends a service request message to a target RAN.

For example, after moving into the target RAN, the UE in idle mode initiates a registration request to the target RAN that the UE requests to access.

Optionally, the service request message sent by the UE carries an identifier of a to-be-activated session. A DNN corresponding to the session identifier may be a LADN or another network type. This embodiment is described for only a case in which the DNN corresponding to the session identifier is the LADN.

S1002: The target AMF receives the service request message sent by the target RAN.

Optionally, the service request message may include location information of the UE and indication information indicating whether the UE is outside of the service area of the LADN. If the target AMF is not configured with the information about the LADN, the indication information is not included in the service request message. It should be noted that, this step may further involve interaction between the target RAN and a source RAN, and/or interaction between the target AMF and the source AMF. The interaction between the target RAN and a source RAN and the interaction between the target AMF and the source AMF both belong to the prior art, and details are not described herein.

S1003: The target AMF selects a first intermediate SMF.

Optionally, when the target AMF detects that the UE moves outside of the service area of the anchor SMF, the target AMF selects and inserts the first intermediate SMF. Alternatively, when the target AMF detects that the UE moves outside of the service area of the source intermediate SMF, the target AMF selects the first intermediate SMF to perform intermediate SMF handover, namely, handover from the source intermediate SMF to the first intermediate SMF.

S1004: The target AMF sends a session create request message to the first intermediate SMF.

Optionally, the session create request message is used to request creation of a session context on the first intermediate SMF.

Optionally, the session create request message includes indication information indicating whether the UE is in a service area of a LADN.

S1005: The first intermediate SMF requests the session context.

As an example, in step S1005a, when the target AMF detects that the UE moves outside of the service area of the anchor SMF, the target AMF requests the session context from the anchor SMF. The session context includes information indicating that a DNN corresponding to a current session is the LADN or a current session is a LADN session.

As another example, in step S1005b, when the target AMF detects that the UE moves outside of the service area of the source intermediate SMF, the target AMF requests the session context from the source intermediate SMF. The session context includes information indicating that a DNN corresponding to a current session is the LADN or a current session is a LADN session.

S1006: The first intermediate SMF determines that the UE is outside of the service area of the LADN.

As an example, the first intermediate SMF learns, through step S1005, that the current session is the LADN session or the DNN corresponding to the current session is the LADN. If the message that is sent by the target AMF and that is received by the first intermediate SMF in step S1004 does not include indication information used to indicate that the UE is outside of the service area of the LADN, the first intermediate SMF determines that the UE is outside of the service area of the LADN.

Optionally, when the first intermediate SMF determines that the UE is not in the service area of the LADN, the first intermediate SMF may directly reject the session, in other words, the first intermediate SMF may release or deactivate the LADN session. In this case, step S1007 and step S1008 are not included in this embodiment. In addition, the first SMF may further send a message to the AMF, where the message carries cause information. For a specific method, refer to the descriptions in Embodiment 3 and Embodiment 4.

S1007: The first intermediate SMF forwards second indication information to the anchor SMF.

Optionally, when the first intermediate SMF does not release or deactivate the session, the anchor SMF may perform an operation of releasing or deactivating the session.

Optionally, after determining that the UE moves outside of the LADN, the first intermediate SMF sends the second indication information to a second SMF. The second indication information is used to indicate that the UE moves outside of the LADN. The second indication information may be: a UE presence in LADN indication is "OUT".

S1008: The anchor SMF performs the operation of releasing or deactivating the first session.

Optionally, when the first intermediate SMF does not release or deactivate the session, the anchor SMF may perform the operation of releasing or deactivating the session. For the operation that is of releasing or deactivating the session and that is performed by the second SMF, refer to the prior art. Details are not described herein.

Figure 11:
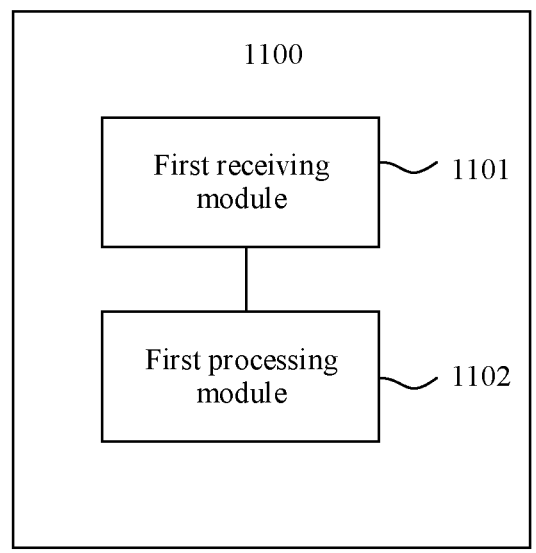
FIG. 11 is a schematic structural diagram of a communications apparatus according to an embodiment of this application.

FIG. 11 is a schematic structural diagram of a communications apparatus according to an embodiment of this application. The communications apparatus 1100 shown in FIG. 11 may correspond to the intermediate session management function SMF described in the embodiment in FIG. 3. The communications apparatus 1100 may include a first receiving module 1101 and a first processing module 1102.

Optionally, the first receiving module 1101 may be configured to receive a request message sent by an access and mobility management function AMF. The request message includes a session identifier.

Optionally, the first processing module 1102 may be configured to: when a session corresponding to the session identifier is a LADN session, reject, by the first processing module, the session corresponding to the session identifier.

Optionally, the communications apparatus 1100 may further include a second processing module. The second processing module is configured to: determine, based on a session context obtained from the anchor SMF, that the session is the LADN session. The session context includes first indication information used to indicate that the session is the LADN session.

Optionally, the communications apparatus 1100 may further include a third processing module. The third processing module is configured to: determine, based on second indication information sent by the AMF, that the session is the LADN session. The second indication information is used to indicate that UE moves outside of a service area of a LADN.

Optionally, the communications apparatus 1100 may further include a first sending module. The first sending module is configured to send a first message to the AMF. The first message includes cause information.

Optionally, the cause information includes: insertion of an intermediate SMF and an intermediate user plane function UPF is rejected for the LADN session.

Figure 12:
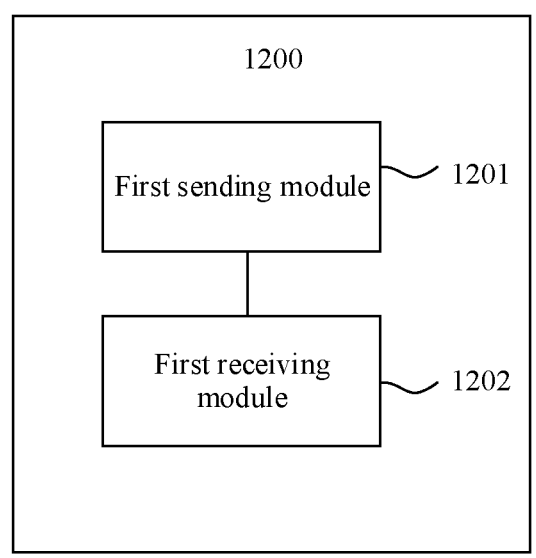
FIG. 12 is a schematic structural diagram of a communications apparatus according to another embodiment of this application.

FIG. 12 is a schematic structural diagram of a communications apparatus according to another embodiment of this application. The communications apparatus 1200 shown in FIG. 12 may correspond to the AMF described in the embodiment in FIG. 1. The communications apparatus 1200 may include a first sending module 1201 and a first receiving module 1202.

Optionally, the first sending module 1201 is configured to send a request message to an intermediate SMF. The request message includes a session identifier, and the intermediate SMF is an SMF selected by the AMF when UE moves outside of a service area of an anchor SMF.

Optionally, the first receiving module 1202 is configured to receive a first message sent by the intermediate SMF. The first message includes cause information.

Optionally, the communications apparatus 1200 may further include a second sending module. The second sending module is configured to send the cause information to a radio access network RAN.

Optionally, the communications apparatus 1200 may further include a third sending module. The third sending module is configured to send a session release request message to the anchor SMF. The session release request message is used to request the anchor SMF to release a LADN session.

Figure 13:
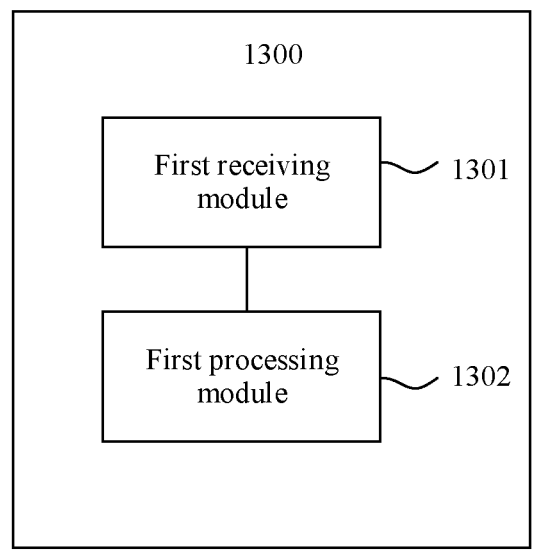
FIG. 13 is a schematic structural diagram of a communications apparatus according to still another embodiment of this application.

FIG. 13 is a schematic structural diagram of a communications apparatus according to still another embodiment of this application. The communications apparatus 1300 shown in FIG. 13 may correspond to the anchor SMF described in the method shown in FIG. 3 or FIG. 4. The communications apparatus 1300 may include a first receiving module 1301 and a first processing module 1302.

Optionally, the first receiving module 1301 is configured to receive a request message sent by an intermediate SMF. The request message includes a session identifier, and the intermediate SMF is an SMF selected by an AMF when UE moves outside of a service area of the anchor SMF.

Optionally, the first processing module 1302 is configured to: when a session corresponding to the session identifier is a LADN session, reject, by the first processing module 1302, the session corresponding to the session identifier. The LADN session is a session served by the anchor SMF.

Optionally, the communications apparatus 1300 may further include a second processing module. The second processing module is configured to: determine, based on a session context, that the current session is a LADN session.

Optionally, the communications apparatus 1300 may further include a second processing module. The second processing module is configured to: determine, based on configuration information, that the current session is a LADN session. The configuration information includes: a DNN corresponding to the current session is a LADN.

Optionally, the communications apparatus 1300 may further include a second sending module. The second sending module is configured to send a second message to the intermediate SMF. The second message includes cause information, and the cause information is used to indicate that the session fails to be activated.

Optionally, that the first processing module rejects the session corresponding to the session identifier includes: releasing the session corresponding to the session identifier, or deactivating the session corresponding to the session identifier, or rejecting activation or handover of the session corresponding to the session identifier.

Figure 14:
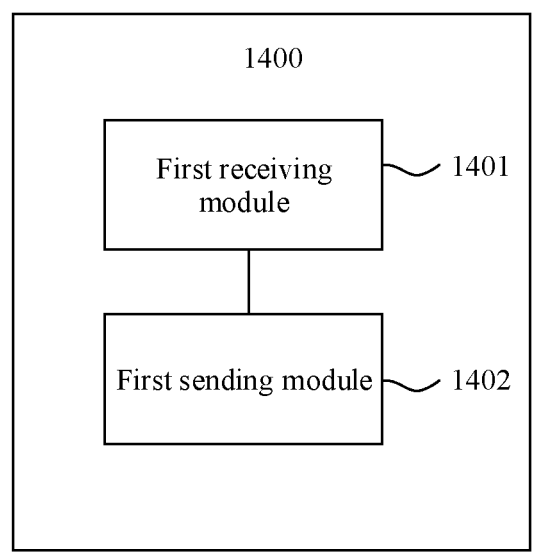
FIG. 14 is a schematic structural diagram of a communications apparatus according to yet another embodiment of this application.

FIG. 14 is a schematic structural diagram of a communications apparatus according to yet another embodiment of this application. The communications apparatus 1400 shown in FIG. 14 may correspond to the first intermediate SMF described above. The communications apparatus 1400 may include a first receiving module 1401 and a first sending module 1402.

Optionally, the first receiving module 1401 is configured to receive first indication information. The first indication information is used to indicate that a data network name DNN corresponding to a current session is a LADN.

Optionally, the first sending module 1402 is configured to send second indication information to an anchor SMF. The second indication information is used to indicate that UE is outside of a service area of the LADN, and the anchor SMF is an anchor SMF serving the current session.

Optionally, the communications apparatus 1400 may further include a second receiving module. The second receiving module is configured to receive a third message sent by a target AMF.

Optionally, the communications apparatus 1400 may further include a first processing module. The first processing module is configured to: when the third message does not include the indication information indicating that the UE is outside of the service area of the LADN, determine that the UE is outside of the service area of the LADN. The target AMF is an AMF to which the UE is handed over.

Optionally, the communications apparatus 1400 may further include a second sending module. The second sending module is configured to: when the second message includes the indication information indicating that the UE is outside of the service area of the LADN, send the second indication information to the anchor SMF.

Optionally, the first indication information is sent by any one of the following network elements: a source AMF, the target AMF, the anchor SMF, or a second intermediate SMF. The second intermediate SMF is configured to control an intermediate UPF that interfaces with a source base station.

Figure 15:
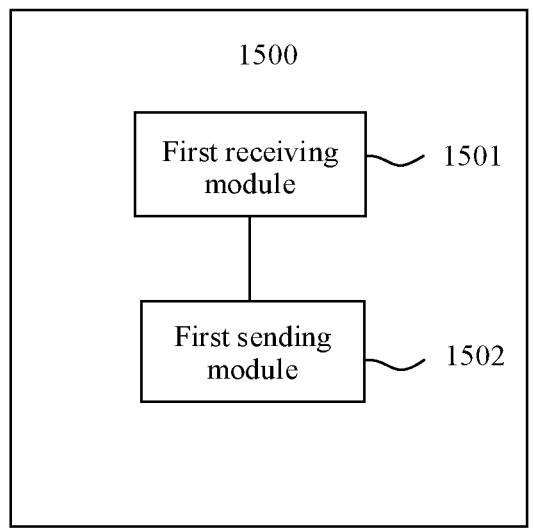
FIG. 15 is a schematic structural diagram of a communications apparatus according to still yet another embodiment of this application.

FIG. 15 is a schematic structural diagram of a communications apparatus according to still yet another embodiment of this application. The communications apparatus 1500 shown in FIG. 14 may correspond to the first target AMF described above. The communications apparatus 1500 may include a first receiving module 1501 and a first sending module 1502.

Optionally, the first receiving module 1501 is configured to receive first indication information sent by a source AMF. The first indication information is used to indicate that a DNN corresponding to a current session is a LADN.

Optionally, the first sending module 1502 is configured to: when the target AMF determines that UE moves outside of a service area of the LADN, send second indication information to a first intermediate SMF. The second indication information is used to indicate that the UE is outside of the service area of the LADN, and the first intermediate SMF is configured to control an intermediate UPF that interfaces with a target base station.

Optionally, the communications apparatus 1500 may further include a first processing module. The first processing module is configured to determine that the UE moves outside of the service area of the LADN.

Optionally, that the first processing module is configured to determine that the UE moves outside of the service area of the LADN includes: the first processing module is configured to determine that the UE moves outside of the service area of the LADN, when the target AMF is not configured with information about the LADN,.

Optionally, that the first processing module determines that the UE moves outside of the service area of the LADN includes: when the target AMF is configured with information about the LADN, determining, based on the information about the LADN and a location of the UE, that the UE moves outside of the service area of the LADN.

Optionally, the information about the LADN includes information about a service area of the LADN.

Figure 16:
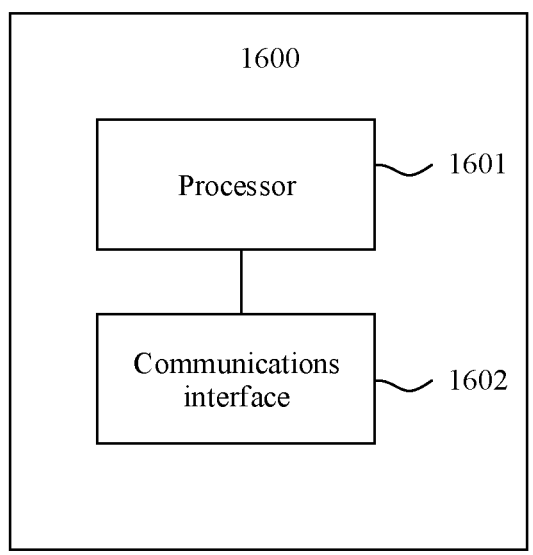
FIG. 16 is a schematic structural diagram of a communications apparatus according to a further embodiment of this application.

FIG. 16 is a schematic structural diagram of a communications apparatus according to a further embodiment of this application. The communications apparatus 1600 shown in FIG. 16 may correspond to the intermediate SMF, the anchor SMF, or the AMF in the session handling method described above. The communications apparatus 1600 includes at least one processor 1601 and a communications interface 1602. The communications interface 1602 may be used for information exchange between the communications apparatus 1600 and another communications apparatus. When a program instruction is executed by the at least one processor 1601, the communications apparatus 1600 is enabled to implement the foregoing step, method, operation, or function performed by the intermediate SMF, the anchor SMF, or the AMF.

It should be understood that, the term "and/or" in this specification describes only an association relationship between associated objects and indicates that three relationships may exist. For example, A and/or B may indicate the following three cases: Only A exists, both A and B exist, and only B exists. In addition, the character "/" in this specification generally indicates an "or" relationship between the associated objects.

It should be understood that sequence numbers of the foregoing processes do not mean execution sequences in the embodiments of this application. The execution sequences of the processes should be determined based on functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the described functions for the particular applications, but it should not be considered that the implementation goes beyond the scope of this application.

It may be clearly understood by the person skilled in the art that, for the purpose of convenient and brief description, for a detailed working process of the foregoing system, apparatus, and unit, refer to a corresponding process in the foregoing method embodiments, and details are not described herein.

In the several embodiments provided in this application, it should be understood that the disclosed system, apparatus, and method may be implemented in another manner. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementations of this application, but are not intended to limit the protection scope of this application. Any variation or replacement readily figured out by the person skilled in the art within the technical scope disclosed in this application shall fall within the protection scope of this application. Therefore, the protection scope of this application shall be subject to the protection scope of the claims.

What is claimed is:

1. A session handling method, comprising:
    receiving, by an anchor session management function, a request message from an intermediate session management function, the request message comprising a session identifier, the intermediate session management function being connected to an access and mobility management function, the intermediate session management function being for serving a user equipment (UE) when the UE moves outside of a service area of the anchor session management function; and
    in response to a session corresponding to the session identifier being a local area data network (LADN) session, releasing, by the anchor session management function, the session corresponding to the session identifier, wherein a service area of a LADN corresponding to the LADN session is in the service area of the anchor session management function.

2. The method according to claim 1, wherein the request message is used to request insertion of the intermediate session management function.

3. The method according to claim 1, further comprising:
    determining, by the anchor session management function based on a session context, that the session is the LADN session; or
    determining, by the anchor session management function based on configuration information, that the session is the LADN session, wherein the configuration information comprises: a data network name (DNN) corresponding to the session is a LADN DNN.

4. The method according to claim 1, further comprising:
    sending, by the anchor session management function, a second message to the intermediate session management function, wherein the second message comprises cause information, and the cause information indicates that the session fails to be activated, or indicates the intermediate session management function to reject activation of the session, or indicates the insertion of the intermediate session management function and an intermediate user plane function is rejected for the LADN session.

5. A communications apparatus, comprising:
    at least one hardware processor coupled to a memory; and
    a communications interface coupled to the at least one hardware processor,
    the communications interface is configured to receive a request message from an intermediate session management function, the request message comprising a session identifier, and the intermediate session management function being connected to an access and mobility management function, the intermediate session management function being for serving a user equipment (UE) when the UE moves outside of a service area of the communications apparatus, and
    wherein the at least one hardware processor is configured to, in response to a session corresponding to the session identifier is a local area data network session, release the session corresponding to the session identifier, wherein a service area of the LADN corresponding to the LADN session is in the service area of the communications apparatus.

6. The communications apparatus according to claim 5, wherein the request message is used to request insertion of the intermediate session management function.

7. The communications apparatus according to claim 5, wherein the at least one hardware processor is further configured to:

determine, based on a session context, that the session is the LADN session; or determine, based on configuration information, that the session is the LADN session, wherein the configuration information comprises: a DNN corresponding to the session is a LADN DNN.

8. The communications apparatus according to claim 5, wherein the communications interface is further configured to:

send a second message to the intermediate session management function, wherein the second message comprises cause information, and the cause information indicates that the session fails to be activated, or indicates the intermediate session management function to reject activation of the session, or indicates the insertion of the intermediate session management function and an intermediate user plane function is rejected for the LADN session.

9. A communications system, comprising:

an anchor session management function; and an intermediate session management function, the anchor session management function comprising at least one first hardware processor coupled to a first memory, and the intermediate session management function comprising at least one second hardware processor coupled to a second memory; and the intermediate session management function is configured to send a request message to the anchor session management function, and the anchor session management function is configured to:

receive the request message from the intermediate session management function, the request message comprising a session identifier, the intermediate session management function being connected to an access and mobility management function, the intermediate session management function being for serving a user equipment (UE) when the UE moves outside of a service area of the anchor session management function; and in response to a session corresponding to the session identifier is a local area data network (LADN) session, release the session corresponding to the session identifier, wherein a service area of the LADN corresponding to the LADN session is in the service area of the anchor session management function.

10. The communications system according to claim 9, further comprising:

the access and mobility management function, wherein the access and mobility management function comprises at least one third hardware processor coupled to a third memory, and is configured to select the intermediate session management function when the UE moves outside of the service area of the anchor session management function.

11. The communications system according to claim 9, wherein the anchor session management function is configured to:

determine, based on a session context, that the session is the LADN session; or determine, based on configuration information, that the session is the LADN session, wherein the configuration information comprises a DNN corresponding to the session is a LADN DNN.

12. A session handling method, comprising:

sending, by an intermediate session management function, a request message to an anchor session management function, the request message comprising a session identifier, the intermediate session management function being connected to an access and mobility management function, the intermediate session management function being for serving a user equipment (UE) when the UE moves outside of a service area of the anchor session management function;

receiving, by the anchor session management function, the request message;

in response to a session corresponding to the session identifier being a local area data network (LADN) session, releasing, by the anchor session management function, the session corresponding to the session identifier, wherein a service area of a LADN corresponding to the LADN session is in the service area of the anchor session management function.

13. The method according to claim 12, wherein the request message is used to request insertion of the intermediate session management function.

14. The method according to claim 12, further comprising:

determining, by the anchor session management function based on a session context, that the session is the LADN session; or determining, by the anchor session management function based on configuration information, that the session is the LADN session, wherein the configuration information comprises: a data network name (DNN) corresponding to the session is a LADN DNN.

15. The method according to claim 12, further comprising:

sending, by the anchor session management function, a second message to the intermediate session management function, wherein the second message comprises cause information, and the cause information indicates that the session fails to be activated, or indicates the intermediate session management function to reject activation of the session, or indicates the insertion of the intermediate session management function and an intermediate user plane function is rejected for the LADN session;

receiving, by the intermediate session management function, the second message.

16. The method according to claim 12, further comprising:

selecting, by the access and mobility management function, the intermediate session management function when the UE moves outside of the service area of the anchor session management function.

17. The communications apparatus according to claim 5, wherein the communications apparatus is an anchor session management function.

* * * * *